United States Patent
Barsness et al.

(10) Patent No.: US 11,481,253 B2
(45) Date of Patent: *Oct. 25, 2022

(54) MANAGING THE PROCESSING OF STREAMED DATA IN A DATA STREAMING APPLICATION USING QUERY INFORMATION FROM A RELATIONAL DATABASE

(71) Applicant: International Business Machines Corporation, Armonk, NY (US)

(72) Inventors: Eric L. Barsness, Pine Island, MN (US); Daniel E. Beuch, Rochester, MN (US); Alexander Cook, London (GB); John M. Santosuosso, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 326 days.

This patent is subject to a terminal disclaimer.

(21) Appl. No.: 16/853,472

(22) Filed: Apr. 20, 2020

(65) Prior Publication Data
US 2020/0249990 A1  Aug. 6, 2020

Related U.S. Application Data

(63) Continuation of application No. 15/881,939, filed on Jan. 29, 2018, now Pat. No. 10,691,489.

(51) Int. Cl.
*G06F 16/00* (2019.01)
*G06F 9/48* (2006.01)
(Continued)

(52) U.S. Cl.
CPC ........ *G06F 9/4881* (2013.01); *G06F 16/2282* (2019.01); *G06F 16/24568* (2019.01); *G06F 16/25* (2019.01)

(58) Field of Classification Search
CPC ........... G06F 16/2228; G06F 16/24568; G06F 16/23; G06F 16/2219; G06F 16/252
See application file for complete search history.

(56) References Cited

U.S. PATENT DOCUMENTS 5,913,912 A  6/1999  Nishimura et al.
6,353,821 B1  3/2002  Gray
(Continued)

OTHER PUBLICATIONS

Fischer et al., "Stream Schema: Providing and Exploiting Static Metadata for Data Stream Processing," EBT 2010, Mar. 22-26, 2010, pp. 207-218. (Year: 2010).*
(Continued)

*Primary Examiner* — Cheryl Lewis
(74) *Attorney, Agent, or Firm* — Cantor Colburn LLP; Nathan Rau

(57) ABSTRACT

Queries are monitored in a database which receives input from a stream computing application to identify data of interest. Parameters defining the data of interest, which are preferably expressed as a logical query, are sent to the stream computing application, which then processes the in-flight streamed data satisfying the parameters in some special manner. In some embodiments, the stream computing application increases the processing priority of in-flight data satisfying the parameters. In some embodiments, the stream computing application applies additional processing steps to the in-flight data satisfying the parameters to provide enhanced data or metadata.

20 Claims, 15 Drawing Sheets

(51) Int. Cl.
  *G06F 16/22* (2019.01)
  *G06F 16/2455* (2019.01)
  *G06F 16/25* (2019.01)

(56) References Cited

U.S. PATENT DOCUMENTS

| | | | |
|---|---|---|---|
| 7,774,336 | B2 | 8/2010 | Beyer et al. |
| 7,849,227 | B2 | 12/2010 | Kashiyama et al. |
| 8,286,191 | B2 | 10/2012 | Amini et al. |
| 8,886,822 | B2 | 11/2014 | Pedersen et al. |
| 8,959,313 | B2 | 2/2015 | Santosuosso et al. |
| 8,990,416 | B2 | 3/2015 | Shukla et al. |
| 9,286,352 | B2 | 3/2016 | Park et al. |
| 9,325,742 | B1 | 4/2016 | Barsness et al. |
| 9,563,486 | B1 | 2/2017 | Narsude et al. |
| 9,659,063 | B2 | 5/2017 | Cammert et al. |
| 9,805,095 | B2 | 10/2017 | Deshmukh et al. |
| 9,836,467 | B1 | 12/2017 | Barsness et al. |
| 10,025,826 | B2 | 7/2018 | Barsness et al. |
| 10,127,283 | B2 | 11/2018 | Barsness et al. |
| 10,515,080 | B2 | 12/2019 | Barsness et al. |
| 10,691,489 | B2 | 6/2020 | Barsness et al. |
| 10,885,050 | B2 | 1/2021 | Barsness et al. |
| 2004/0268244 | A1 | 12/2004 | Levanoni et al. |
| 2006/0064579 | A1 | 3/2006 | Aaron et al. |
| 2006/0230029 | A1 | 10/2006 | Fan |
| 2007/0006173 | A1 | 1/2007 | Sohm et al. |
| 2007/0112866 | A1 | 5/2007 | Olson-Williams |
| 2007/0136254 | A1 | 6/2007 | Choi et al. |
| 2009/0150396 | A1 | 6/2009 | Elisha et al. |
| 2011/0064079 | A1 | 3/2011 | Lim et al. |
| 2011/0239048 | A1 | 9/2011 | Andrade et al. |
| 2012/0179809 | A1 | 7/2012 | Barsness et al. |
| 2013/0091123 | A1 | 4/2013 | Chen et al. |
| 2013/0111038 | A1 | 5/2013 | Girard |
| 2013/0212066 | A1 | 8/2013 | Dehn et al. |
| 2013/0239100 | A1 | 9/2013 | Andrade et al. |
| 2014/0095462 | A1 | 4/2014 | Park et al. |
| 2014/0095473 | A1 | 4/2014 | Srinivasan et al. |
| 2015/0142952 | A1 | 5/2015 | Bragstad et al. |
| 2015/0227415 | A1 | 8/2015 | Alves et al. |
| 2016/0342658 | A1 | 11/2016 | Skrzypczak et al. |
| 2017/0116050 | A1 | 4/2017 | Thukkaram et al. |
| 2017/0116210 | A1 | 4/2017 | Park et al. |
| 2017/0116283 | A1 | 4/2017 | Park et al. |
| 2018/0246936 | A1 | 8/2018 | Srinivasan et al. |
| 2019/0102431 | A1 | 4/2019 | Bishnoi et al. |

OTHER PUBLICATIONS

Nehme et al., "Streamshield: A Stream-Centric Approach Towards Security and Privacy in Data Stream Environments," SIGMOD, '09, Jun. 29-Jul. 2, 2009, ACM, pp. 1027-1029. (Year: 2009).*

Anonymous, PipelineDB Home Page, (Archived screen shot of page published on World Wide Web at http://www.pipelinedb.com, available from https://web.archive.org/web/*/www.pipelinedb.com, archived on Oct. 13, 2016, original publication date unknown).

Anonymous, PipelineDB Docs, (Archived screen shots of multiple pages published on World Wide Web at http://docs.pipelinedb.com, available from //https://web.archive.org/web/*/docs.pipelinedb.com, archived on Aug. 25, 2016, original publication date unknown).

Anonymous, PipelineDB Examples, (Archived screen shots of multiple pages published on World Wide Web at http://pipelinedb.com/examples, available from https://web.archive.org/web/*/www.pipelinedb.com/examples, archived on Dec. 21, 2015, original publication date unknown).

Avnur et al., "Eddies: Continuously Adaptive Query Processing", ACM SIGMOD Record vol. 29, No. 2, ACM, 2000.

Babu et al., "Adaptive Ordering of Pipelined Stream Filters", ACM SIGMOD 2004 Jun. 13-18, 2004, Paris, France.

Deshpande et al., "Adaptive Query Processing", Foundations and Trends in Databases, vol. 1, No. 1 (2007), pp. 1-140.

Golab et al., "Issues in Data Stream Management", ACM SIGMOD Record, vol. 32, No. 2, Jun. 2003.

Tian et al., "Tuple Routing Strategies for Distributed Eddies", Proceedings of the 29th International Conference on Very Large Databases, vol. 29, Berlin, Germany, VLDB Endowment, 2003.

Sotiropoulos, et al., "LinkViews: An Integration Framework for Relational and Stream Systems", In BIRTE Workshop, Int. Conf. on VLDB, published at http://birte2013.cs.aau.dk/files/Sotiropoulos.pdf (Sep. 2013).

Splunk, Inc., "Splunk DB Connect Fact Sheet", published on World Wide Web at https://www.splunk.com/web_assets/pdfs/secure/Splunk_for_DB_Connect.pdf, available from https://web.archive.org/web/*/https://www.splunk.com/web_assets/pdfs/secure/Splunk_for_DB_Connect.pdf (archived on Sep. 24, 2015, original publication date unknown).

Laxman et al., "Stream Prediction Using a Generative Model Based on Frequent Episodes in Event Sequences", KDD '08, Las Vegas, Nevada, USA, Aug. 27, 2008, ACM 978-1-60558-193—Apr. 8, 2008, pp. 453-461.

Beth Plale et al., "Dynamic Querying of Streaming Data with the dQUOB System", IEEE Transactions on Parallel and Distributed Systems, vol. 14, No. 4, pp. 422-426 (Apr. 2003).

Qiong Zou et al., "From a Stream of Relational Queries to Distributed Stream Processing", Proceedings of the VLDB Endowment, vol. 3, No. 2, 2010, pp. 1394-1405 (Sep. 2010).

Gabriela Jacques-Silva et al., "Consistent Regions Guaranteed Tuple Processing in IBM Streams", Proceedings of the VLDB Endowment, vol. 9, No. 13, pp. 1341-1342 (2016).

International Business Machines Corporation, "List of IBM Patents or Patent Applications Treated as Related", filed in USPTO in present application herewith, No Date Provided.

* cited by examiner

MANAGING THE PROCESSING OF STREAMED DATA IN A DATA STREAMING APPLICATION USING QUERY INFORMATION FROM A RELATIONAL DATABASE

CROSS-REFERENCE TO RELATED APPLICATIONS

The present application is a continuation of U.S. patent application Ser. No. 15/881,939, filed Jan. 29, 2018, entitled. "Managing the Processing of Streamed Data in a Data Streaming Application Using Query Information from a Relational Database", which is herein incorporated by reference.

The present application is also related to the following commonly assigned U.S. patent applications and patents, all of which are herein incorporated by reference: Patent application Ser. No. 15/339,772, entitled "Projecting Effect of In-Flight Streamed Data on a Relational Database", filed Oct. 31, 2016, now issued as U.S. Pat. No. 10,127,283; Patent application Ser. No. 15/339,800, entitled "Querying In-Flight Streamed Data from a Relational Database", filed Oct. 31, 2016, now issued as U.S. Pat. No. 10,025,286; and patent application Ser. No. 15/339,819, entitled "Altering In-Flight Streamed Data from a Relational Database", filed Oct. 21, 2016, now issued as U.S. Pat. No. 9,836,467.

FIELD

This disclosure generally relates to stream computing, and in particular, to computing applications that receive streaming data and process the data as it is received.

BACKGROUND

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

Modern computer systems may be used to support a variety of applications, but one common use is the maintenance of large relational databases, from which information may be obtained. A large relational database is often accessible to multiple users via a network, any one of whom may query the database for information and/or update data in the database.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

Stream-based computing, also called data streaming, has been used to more effectively handle large volumes of incoming data in real time. In a data streaming application, data moves through a connected network of "processing elements" called a "graph", each processing element performing some function or functions with respect to the data.

Many data streaming applications produce data which is ultimately integrated with a relational database, i.e., it becomes new or updated entries in one or more tables in a relational database. Due to the capability of a data streaming application to handle large volumes of data, there could be a large number of new or updated entries in a database table, so large that it could be significant in comparison to data already in the table.

Conventional database query and other management techniques take no account of data which is likely to change in the near future, and in particular, of in-flight data in a streaming application which may affect the future character of the database. As a result, queries against data in the database do not necessarily reflect the most recent information.

SUMMARY

A stream-based computing application provides input to a computerized database. Queries against data in the database are monitored to generate at least one parameter identifying data of interest. The at least one parameter identifying data of interest is used to identify selective in-flight data of interest in the stream computing application. The manner in which the selective in-flight data of interest is processed by the stream computing application is modified, as by adjusting a processing priority and/or otherwise adjusting the manner in which the selective in-flight data is processed.

In one or more embodiments, a stream computing application processes incoming data to produce data tuples which are entered into at least one table of a relational database. A query monitor within the relational database monitors queries to identify tuples of interest, which could be tuples satisfying the logical search parameters of one or more queries. The query monitor generates one or more meta-query commands, which are logical expressions in the form of queries specifying tuples of interest to users of the database and special processing actions to be performed. For example, a meta-query command could use the well-known SQL protocol, or any other query protocol, or a specially designed protocol. The meta-query commands are provided to the stream computing application. The stream computing application identifies in-flight tuples of interest using the logical expressions in the meta-query commands, and alters the manner in which the in-flight tuples of interest are processed in the stream computing application to provide enhanced input to the database.

In one or more embodiments, the stream computing application alters the manner in which the in-flight tuples of interest are processed by adjusting a processing priority of the in-flight tuples of interest, causing such tuples to be processed and entered into at least one database table more quickly that would have occurred without increasing the processing priority. In one or more additional or alternative embodiments, the stream computing application alters at least one processing parameter to provide enhanced data associated with the tuples of interest, which could include data for inclusion in one or more database tables of the database or metadata for use by the database. Enhancing data may include, for example: using any of various algorithms to provide greater accuracy, resolution, or other desirable qualities of processed data, even at the cost of greater processing and/or storage overhead; using any of various algorithms to identify patterns or features of the tuple data; using any various algorithms to identify and/or correct probable errors in the data; and so forth.

By using recent database query data to manage the processing of data in a stream computing application as disclosed herein, streamed data which is input to the database and which is relevant to recent queries can be made more current, accurate, and/or complete, thereby improving the utility of the database from the perspective of its clients/users.

The details of the present invention, both as to its structure and operation, can best be understood in reference to the accompanying drawings, in which like reference numerals refer to like parts, and in which:

DETAILED DESCRIPTION

Streams Processing Overview

Figure 1:
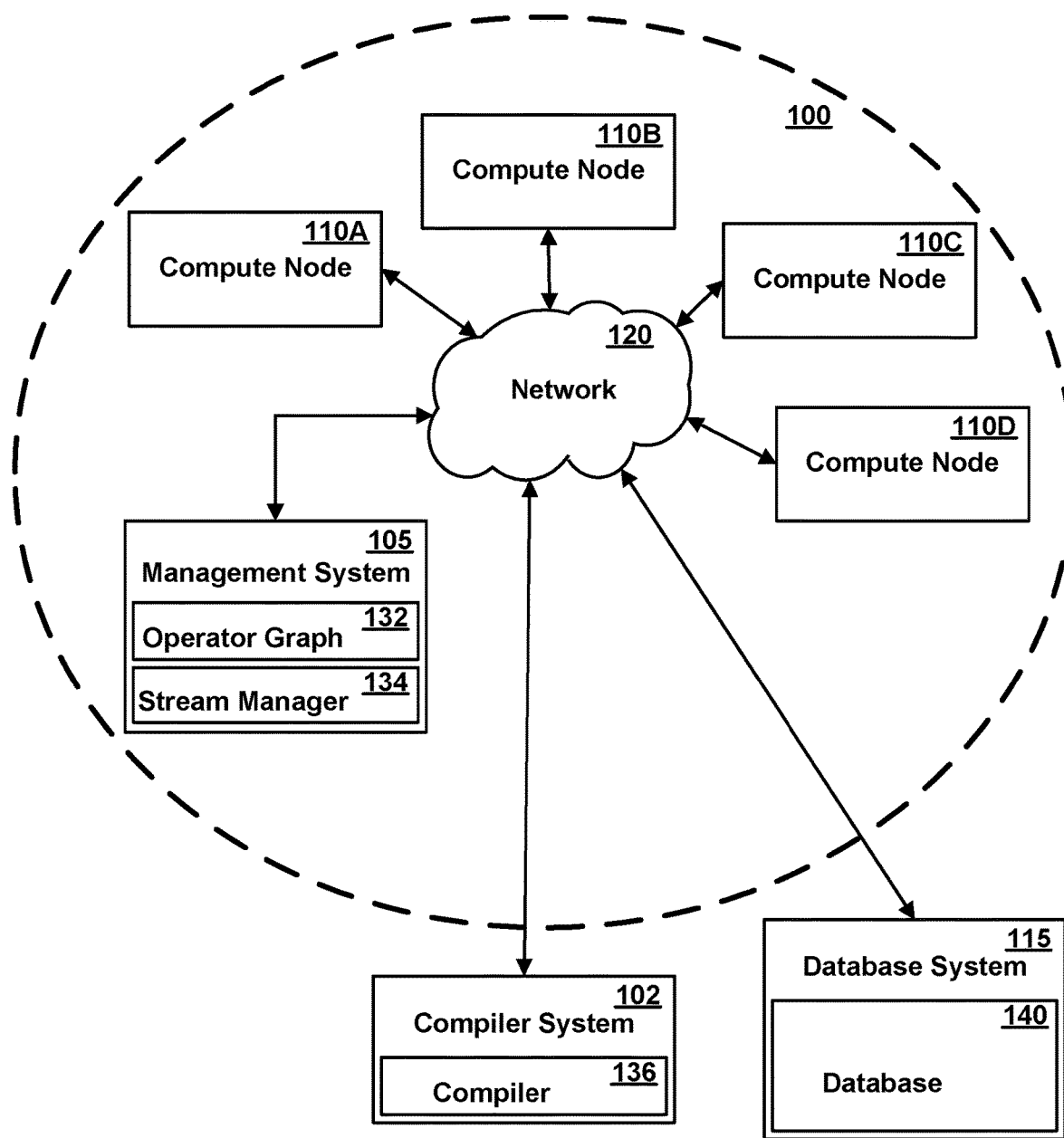
FIG. 1 illustrates a computing infrastructure configured to execute a stream computing application according to various embodiments.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may or may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

FIG. 1 illustrates one exemplary computing infrastructure 100 that may be configured to execute a stream computing application, according to some embodiments. The computing infrastructure 100 includes a management system 105 and two or more compute nodes 110A-110D (herein generically referred to as feature 110)—i.e., hosts—which are communicatively coupled to each other using one or more communications networks 120. The communications network 120 may include one or more servers, networks, or databases, and may use a particular communication protocol to transfer data among compute nodes 110. A compiler system 102 may be communicatively coupled with the management system 105 and the compute nodes 110 either directly or via the communications network 120. Additionally, a database system 115 containing a database 140 may be communicatively coupled to network 120 for communication with management system 105 and/or compute nodes 110.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Computer System Hardware Components

Figure 2:
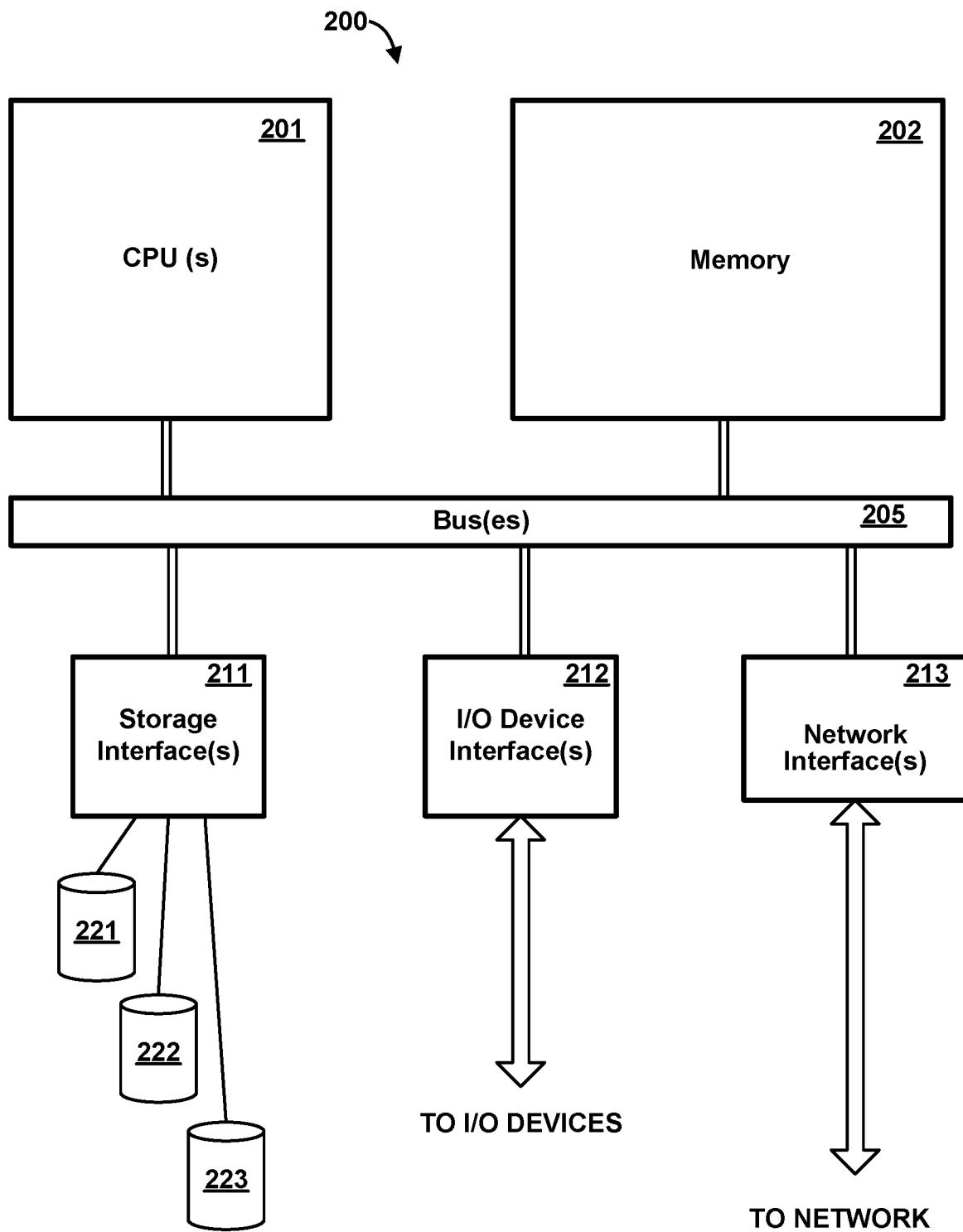
FIG. 2 is a high-level block diagram of the major hardware components of a representative general purpose computer system which could be used to perform the role of any of several functional elements, according to various embodiments.

FIG. 2 is a high-level block diagram of the major hardware components of a representative general purpose computer system 200. In one or more embodiments, compiler system 102, management system 105, compute nodes 110, and database system 115 are each physically embodied as respective one or more general purpose computer systems, system 200 being a representation of any such general purpose computer system.

Computer system 200 includes one or more general-purpose programmable processors (CPU) 201 which execute instructions and process data from main memory 202. Main memory 202 is preferably a volatile random access memory comprising at least one, and typically multiple, semiconductor integrated circuit chip modules, using any of various memory technologies, in which data is loaded from storage or otherwise for processing by CPU(s) 201.

One or more communications buses 205 provide a data communication path for transferring data among CPU(s) 201, main memory 202 and various interface units 211, 212, 213, which may also be known as I/O processors (IOPs) or I/O adapters (IOAs). The interface units support communication with a variety of storage, I/O devices, and/or networks. For example, storage interface unit(s) 211 supports the attachment of one or more storage devices 221-223 providing non-volatile storage of data which can be loaded into memory as required. Such storage devices may include well-known rotating magnetic hard disk drive storage devices, solid state devices (SSD), removable memory cards, optical storage, flash memory, and so forth, and could further include network attached storage (NAS), devices attached via a storage area network (SAN), and/or arrays of disk drives and/or other storage devices configured to appear as a single large storage device to a host. Storage may further include cloud storage devices accessible via one or more networks. I/O device interface unit(s) 212 may support the attachment of any of various other types of I/O devices, such as user terminals, displays, keyboards or other input devices, printers, and so forth, it being understood that other or additional types of I/O devices could be used. Network interface adapter(s) 213 may support connections to one or more external networks for communication with one or more other digital devices, and specifically to network 120 for communication with devices represented in FIG. 1. Network adapter(s) 213 could support redundant connections to a single network, or could be coupled to separate networks, which may or may not be in communication with each other. Such external networks preferably include the Internet, and may include one or more intermediate networks, such as local area networks, through which communication with the Internet is effected.

It should be understood that FIG. 2 is intended to depict the representative major components of general purpose computer system 200 at a high level, that individual components may have greater complexity than represented in FIG. 2, that components other than or in addition to those shown in FIG. 2 may be present, that the number, type and configuration of such components may vary, and that a complex computer system will typically have more components than represented in FIG. 2. Several particular examples of such additional complexity or additional variations are disclosed herein, it being understood that these are by way of example only and are not necessarily the only such variations.

Although only a single CPU 201 is shown for illustrative purposes in FIG. 2, computer system 200 may contain multiple CPUs, as is known in the art. Although main memory 202 is shown in FIG. 2 as a single monolithic entity, memory 202 may in fact be distributed and/or hierarchical, as is known in the art. For example, memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although communications buses 205 are shown in FIG. 2 as a single entity, in fact communications among various system components is typically accomplished through a complex hierarchy of buses, interfaces, and so forth, in which higher-speed paths are used for communications between CPU(s) 201 and memory 202, and lower speed paths are used for communications with I/O interface units 211-213. Buses 205 may be arranged in any of various forms, such as point-to-point links in hierarchical, star or web configurations, multiple hierarchical buses, parallel and redundant paths, etc. For example, as is known in a NUMA architecture, communications paths are arranged on a nodal basis. Buses may use, e.g., an industry standard PCI bus, or any other appropriate bus technology. While multiple I/O interface units are shown which separate buses 205 from various communications paths running to the various I/O devices, it would alternatively be possible to connect some or all of the I/O devices directly to one or more system buses. Although FIG. 1 represents network 120 as a single entity, in one or more embodiments a separate network or storage bus may be present for communicating with one or more shared storage servers, and such communication may be driven by a dedicated one or more storage interface units 211 separate from general purpose network adapters 213.

Computer system 200 depicted in FIG. 2 may include multiple attached terminals, such as might be typical of a multi-user "mainframe" computer system. Where computer system 200 is used exclusively as a compute node 110 or other server for performing work on behalf of remote clients, it may contain only a limited number of terminals, or even a single terminal, e.g., for use as a maintenance interface by a system administrator or the like, or in some cases no terminal at all, administrative functions being performed remotely. Furthermore, while certain functions are described herein for illustrative purposes as embodied in a single computer system, some or all of these functions could alternatively be implemented using a distributed network of computer systems in communication with one another, in which different functions or steps described herein are performed on different computer systems.

Although compute nodes 110, management system 105, compiler system 102, and database system 115 are represented in FIGS. 1-2 as independent systems, any or all of these entities may be implemented as corresponding logical partitions of one or more logically partitioned computer systems. For example, any of CPUs 201 may in fact be a corresponding portion of a processing resource capacity of a larger logically partitioned computer system which is allocated to the corresponding logical partition; and any memory 202 may in fact be a corresponding portion of a memory capacity of a larger logically partitioned computer system which is allocated to the corresponding logical partition.

While various system components have been described and shown at a high level, it should be understood that a typical computer system contains many other components not shown, which are not essential to an understanding of the present invention.

Stream Computing Components

Figure 3:
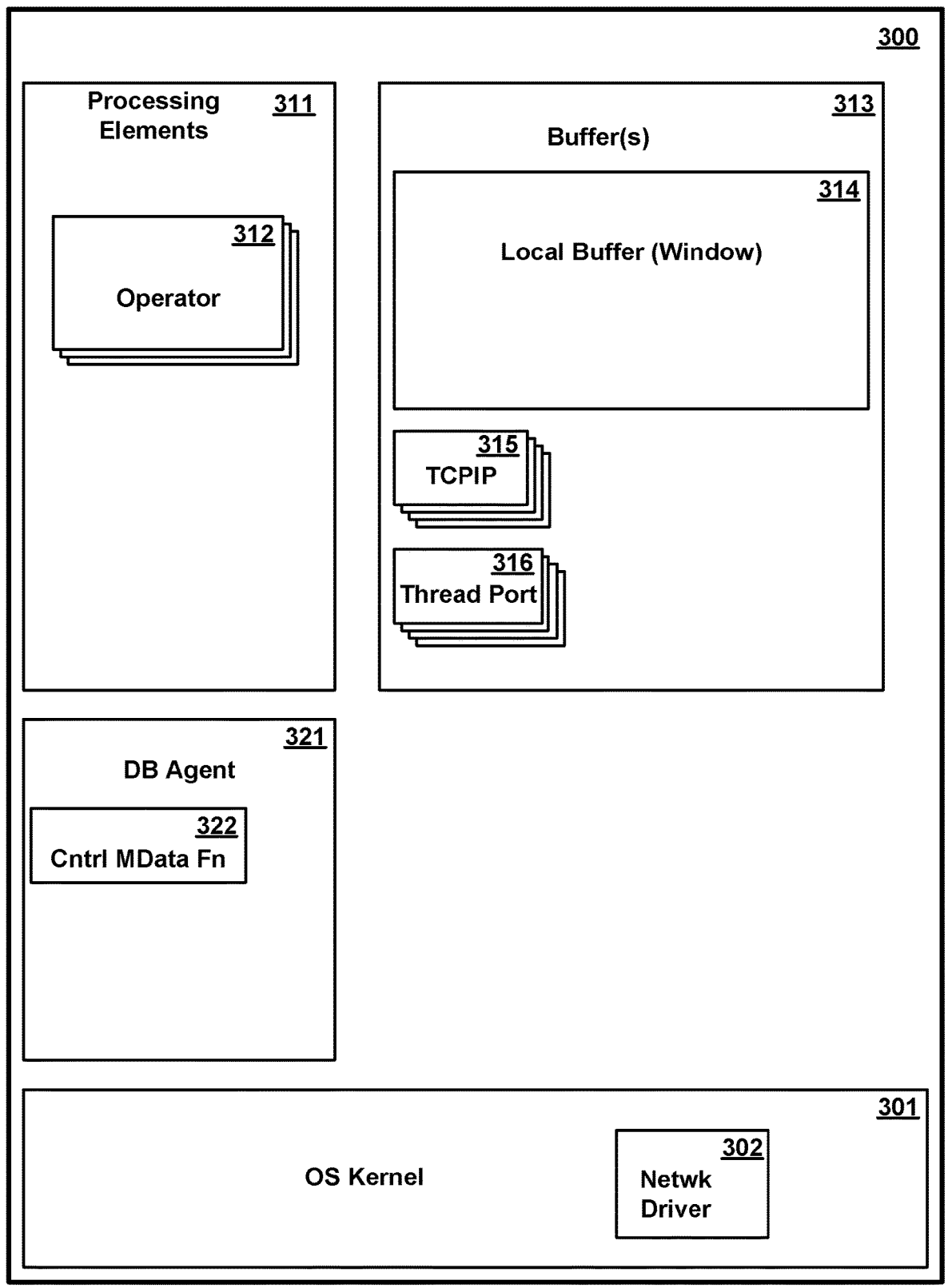
FIG. 3 is a conceptual illustration of certain software components in memory of a compute node of FIG. 1, according to various embodiments.

FIG. 3 is a conceptual illustration showing in greater detail certain software components in memory 300 of a compute node 110, which may be the same as one of the compute nodes 110A-110D of FIG. 1, according to various embodiments. As shown in FIG. 3, a representative compute node memory includes an operating system kernel 301, one or more processing elements 311, a buffer 313, and a compute node database agent 321.

Operating system kernel 301 is executable code and state data providing various low-level software functions, such as device interfaces, management of memory pages, management and dispatching of multiple tasks, common services for application programs, etc. as is well known in the art. In particular, OS kernel 301 preferably includes one or more network adapter drivers 302 for handling communications with one or more networks, including network 120, via network interface(s) 213.

The one or more processing elements 311 each comprise code and state data for performing respective functions as part of a data stream computing application. A stream computing application may include one or more stream operators 312 that may be compiled into a "processing element" container 311. The memory 300 may include two or more processing elements 311, each processing element having one or more stream operators 312. Each stream operator 312 may include a portion of code that processes tuples flowing into a processing element and outputs tuples to other stream operators 312 in the same processing element, in other processing elements, or in both the same and other processing elements in a stream computing application. Processing elements 311 may pass tuples to other processing elements that are on the same compute node 110 or on other compute nodes that are accessible via communications network 120. For example, a processing element 311 on compute node 110A may output tuples to a processing element 311 on compute node 110B. In one embodiment, a processing element 311 is assigned to be executed by only one CPU, although in other embodiments the stream operators 312 of a processing element 311 may include multiple threads which may be executed on different respective CPUs.

Buffer 313 is a portion of memory 300 for holding data being streamed as part of the stream computing application, and in particular, for holding data tuples. Buffer 313 may be a single entity, but in one or more embodiments, multiple buffers exist including a local buffer 314 also known as a window, one or more TCPIP buffers 315 for passing messages among various entities of the data streaming applications, and one or more thread ports 316 for queuing data to be processed be respective one or more threads.

Figure 4:
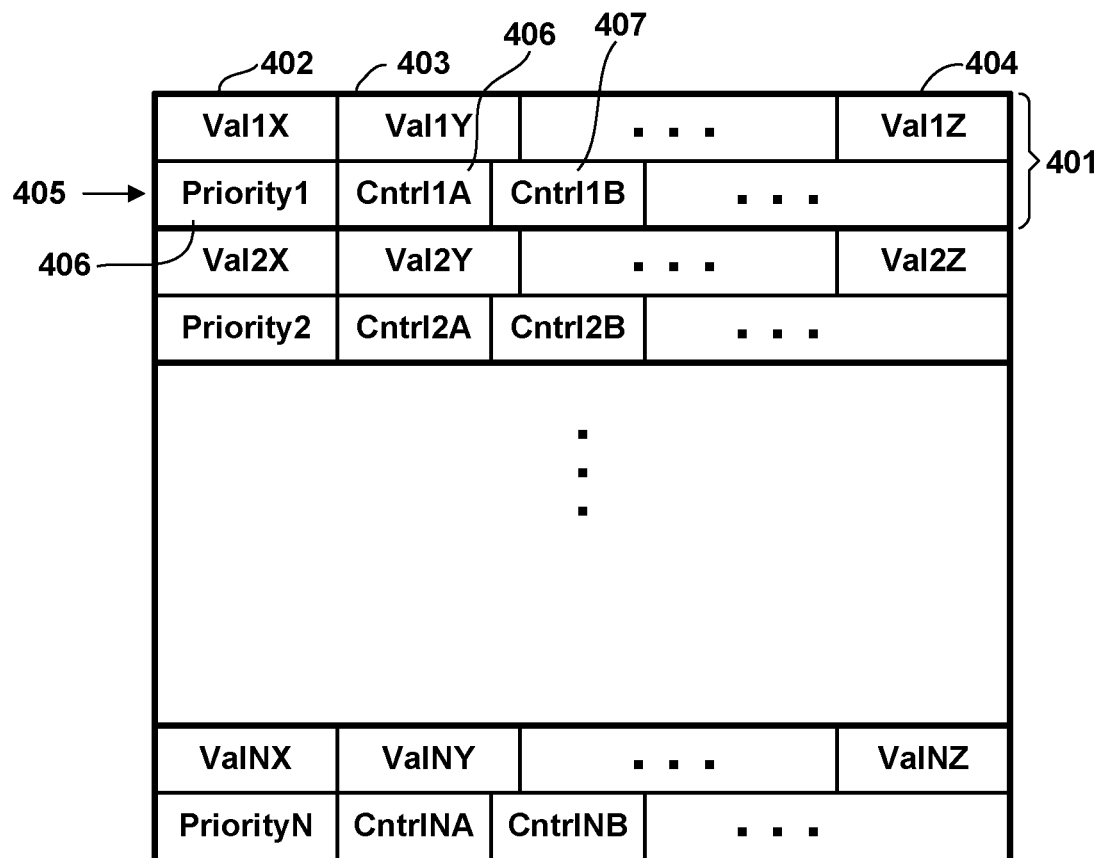
FIG. 4 is a conceptual representation of a set of tuples in a streaming data application buffer, according to various embodiments.

FIG. 4 is a conceptual representation of a set of tuples in a streaming data application buffer 313, according to various embodiments. Any of buffers 314-316 may hold one or more tuples. As illustrated in FIG. 4, a set of tuples contains one or more tuples 401, each tuple logically organized as multiple fields or attributes 402-404. A set of tuples may be conceptually represented as a table, in which each tuple 401 corresponds to a respective row of the table, and each attribute or field of a tuple corresponds to a respective column of the table. Although conceptually represented as a table, the actual structure of a set of tuples in memory may vary, and may be different in each of the different buffers 314-316; the set may occupy non-contiguous memory address regions, tuples may vary in size; some attributes might be present in only a subset of the tuples, and so forth. Although the data streaming application produces tuples which are added to a table of a database, the structure and attributes of tuples 401 within the data streaming application are not necessarily identical to those of tuples in a table of a relational database. The tuples 401 stored in buffer 313 may be all of a single type (i.e., all have the same attributes and structure), or may be tuples of different types. In one or more embodiments, tuples may be grouped separately in separate sets or in different buffers depending on current status of a tuple within the operator graph. For example, one set of tuples may comprise tuples 401 awaiting processing by a particular processing element 311 within the compute node while another set comprises tuples 401 which have already been processed by the particular processing element.

In various embodiments, each tuple additionally contains or is associated with respective control metadata 405. Control metadata 405 is data which is used to control the processing of the corresponding tuple within the operator graph, and is generally not output to database 140. In one or more embodiments, control metadata includes at least one priority attribute 406 which controls or affects the processing priority accorded to the corresponding tuple within the operator graph. For example, an elevated processing priority as expressed by the priority attribute 406 may cause the tuple with which it is associated to be processed by one or more processing elements of the operator graph out of chronological order, and ahead of other tuples having a lower processing priority. Control metadata 405 may include other or additional control attributes represented in FIG. 4 as features 407 and 408. These may, for example, control branches taken within the operator graph, optional processing performed, and so forth.

Compute node database agent 321 is executable code and state data which performs certain functions on behalf of a requesting entity with respect to data in the data streaming application, and in particular, with respect to tuples 315 temporarily stored in buffer 313, as explained in greater detail herein. In general, compute node database agent performs functions which enable a relational database to access streaming data. In one or more embodiments, the requesting entity is a management system database agent 521 executing in management system 105, although the requesting entity could alternatively be a relational database itself. In one or more embodiments, compute node database agent 321 includes a control metadata function 322 which alters or sets the values of one or more control metadata 405 attributes in selective tuples 401 of the data streaming application, which thereafter govern how the selective tuples are processed. Database agent 321 may include other or additional functions. For example, agent 321 could include a query function for executing queries on behalf of a requesting entity against data in buffer 313 and returning query results to the requesting entity, or an edit/delete function which performs edit and/or delete operations on data in buffer 313 on behalf of a requesting entity, as described in greater detail in any of commonly assigned U.S. patent application Ser. No. 15/339,772, filed Oct. 31, 2016, commonly assigned U.S. patent application Ser. No. 15/339,800, filed Oct. 31, 2016, or commonly assigned U.S. patent application Ser. No. 15/339,819, filed Oct. 21, 2016, all of which are herein incorporated by reference.

Figure 5:
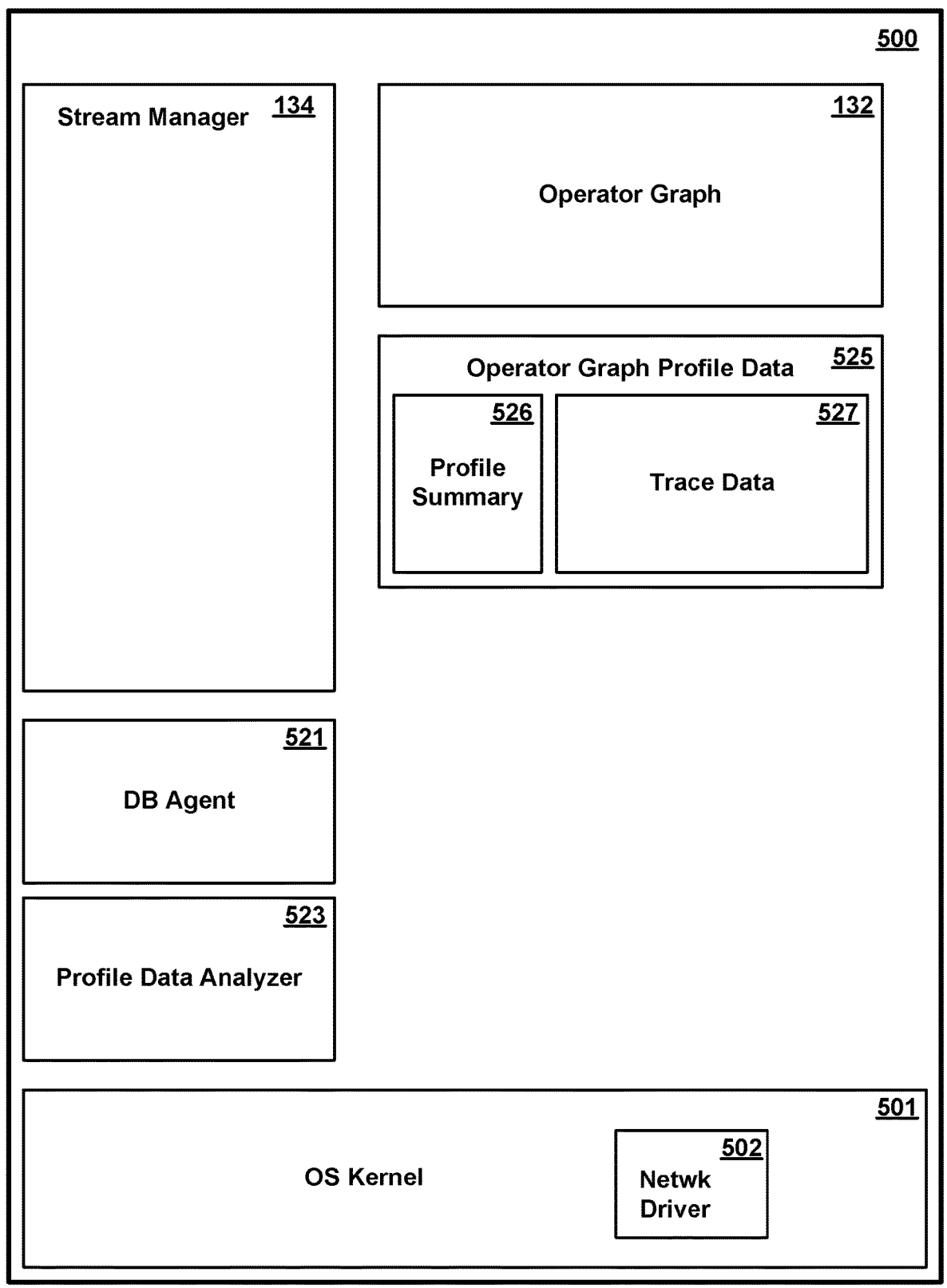
FIG. 5 is a conceptual illustration of certain software components in memory of the management system of FIG. 1 according to various embodiments.

FIG. 5 is a conceptual illustration showing in greater detail certain software components in memory 500 of the management system 105 of FIG. 1 according to various embodiments. As shown in FIG. 5, a representative management system memory includes an operating system kernel 501, a stream manager 134, an operator graph 136, a management system database agent 521, a profile data analyzer 523, and operator graph profile data 525.

Operating system kernel 501 is executable code and state data providing various low-level software functions, such as device interfaces, management of memory pages, management and dispatching of multiple tasks, common services for application programs, etc. as is well known in the art. In particular, OS kernel 501 preferably includes one or more network adapter drivers 502 for handling communications with one or more networks, including network 120, via network interface(s) 213.

Stream manager 134 manages the operation of the data streaming application, and in particular, maintains operator graph 132. Operator graph 132 is a data structure defining how tuples are routed to processing elements 311 for processing.

Management system database agent 521 is executable code and state data which performs certain database related functions with respect to data in the data streaming application at the request of a relational database. These database related functions may involve access to data in the buffers 313 of one or more compute nodes 110, for which management system database agent 521 communicates with corresponding compute node database agents 321 in the respective one or more compute nodes 110. In particular, in one or more embodiments, management system database agent 521 communicates to one or more selective corresponding compute node database agents 321 information regarding data of interest to the database 140, such as how data of interest is to be identified and how it is to be processed in the operator graph. Management system database agent 521 may optionally perform any of various additional operations useful to the database, including the collection and transmission of query results to the database or projection of data to enter the database, as described in greater detail in any of commonly assigned U.S. patent application Ser. No. 15/339,772, filed Oct. 31, 2016, commonly assigned U.S. patent application Ser. No. 15/339,800, filed Oct. 31, 2016, or commonly assigned U.S. patent application Ser. No. 15/339,819, filed Oct. 21, 2016, all of which are herein incorporated by reference.

Figure 12:
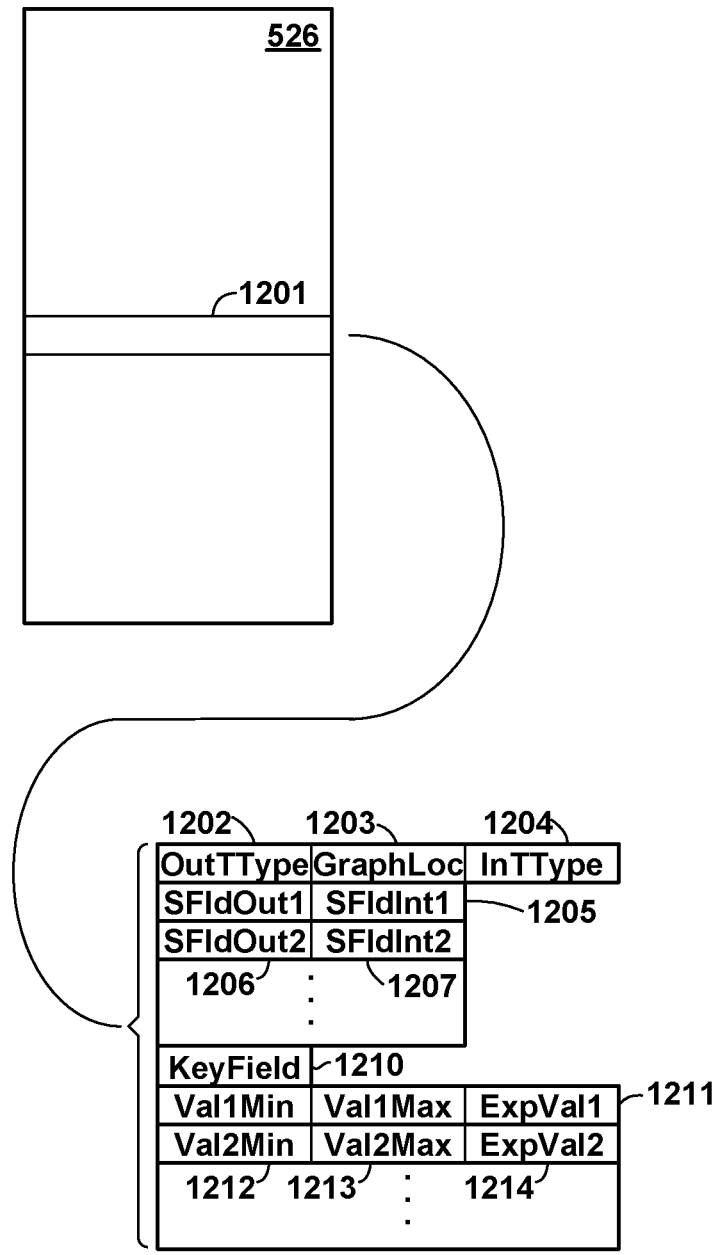
FIG. 12 is a conceptual illustration of the structure of an exemplary set of profile summary records, according to various embodiments.

Profile data analyzer 523 is executable code and state data which collects trace data from the various compute nodes and analyzes that data to construct and maintain operator graph profile data 525. Operator graph profile data 525 includes profile summary records 526 and trace data 527. Trace data 527 is a collection of all or selective portions of trace data 318 from the various compute nodes, and is used to by profile data analyzer to generate profile summary records 526. Profile summary records are a representation of historical data streaming flow patterns. For example, profile summary records may represent a number, proportion or other measure of tuples entering and leaving each processing element, attributes within tuples which are changed, deleted or added by each processing element, and so forth. Tuple data flow may further be represented separately for different attribute key values within a tuple. Exemplary profile summary data 526 is illustrated in FIG. 12 and described in greater detail herein.

Figure 6:
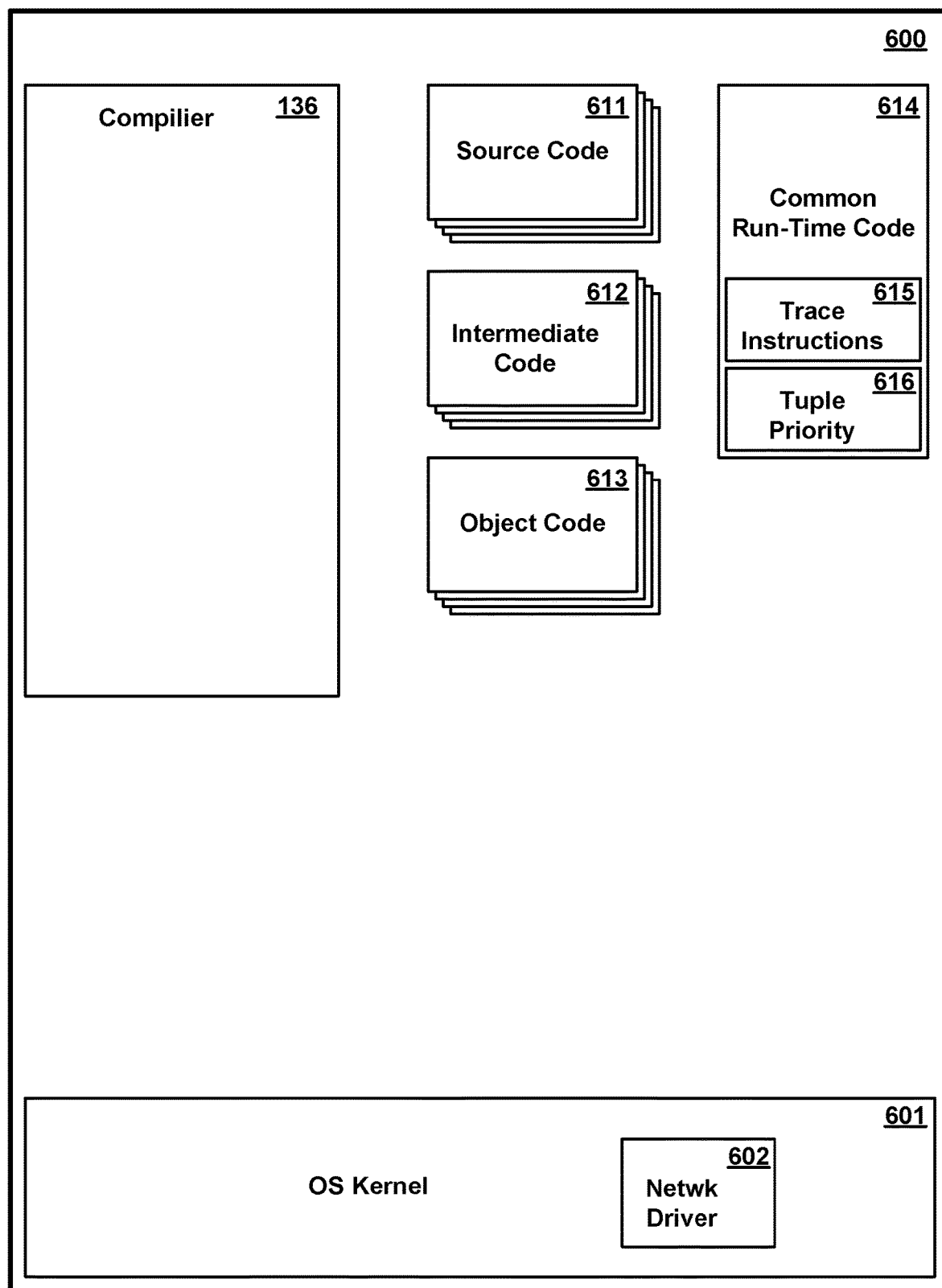
FIG. 6 is a conceptual illustration of certain software components in memory of the compiler system of FIG. 1 according to various embodiments.

FIG. 6 is a conceptual illustration showing in greater detail certain software components in memory 600 of the compiler system 102 of FIG. 1 according to various embodiments. As shown in FIG. 6, a representative compiler system memory includes an operating system kernel 601, a compiler 136, and compiler input and output in the form of source modules 611, intermediate code modules 612, and object code modules 613.

Operating system kernel 601 is executable code and state data providing various low-level software functions, such as device interfaces, management of memory pages, management and dispatching of multiple tasks, common services for application programs, etc. as is well known in the art. In particular, OS kernel 601 preferably includes one or more network adapter drivers 602 for handling communications with one or more networks, including network 120, via network interface(s) 213.

Compiler 136 is executable code and data structures which compiles modules, which include source code or statements 611, into the object code 613, which includes machine instructions that execute on a processor. In one embodiment, the compiler 136 may translate the modules into an intermediate form 612 before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 132.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Compiler system memory 600 further includes common run-time code 614. Common run-time code can be any of source code, intermediate code, or object code. Common run-time code 614 is common code which is included in the code of each processing element 311 to perform functions common to all or many processing elements. Common run-time code may include, for example, functions for passing messages among the various processing elements, accessing buffer 313, reporting errors or other status, and so forth. In one or more embodiments, common run-time code includes trace instructions 615 for collecting trace data 318 tracing operation of the data streaming application. Trace data 318 collected by executing trace instructions 615 may be used for building operator graph profile data 525. Trace instructions 615 may be optionally included instructions, i.e., instructions which the compiler 136 optionally includes in the code of a processing element depending on the settings or directions given to the compiler at time of compilation. In one or more embodiments, common run-time code 614 further includes tuple priority instructions 616 for determining a priority of processing for each tuple in the data stream using the tuple's respective priority attribute 406 (and optionally other data), and processing tuples in order of priority order.

Figure 7:
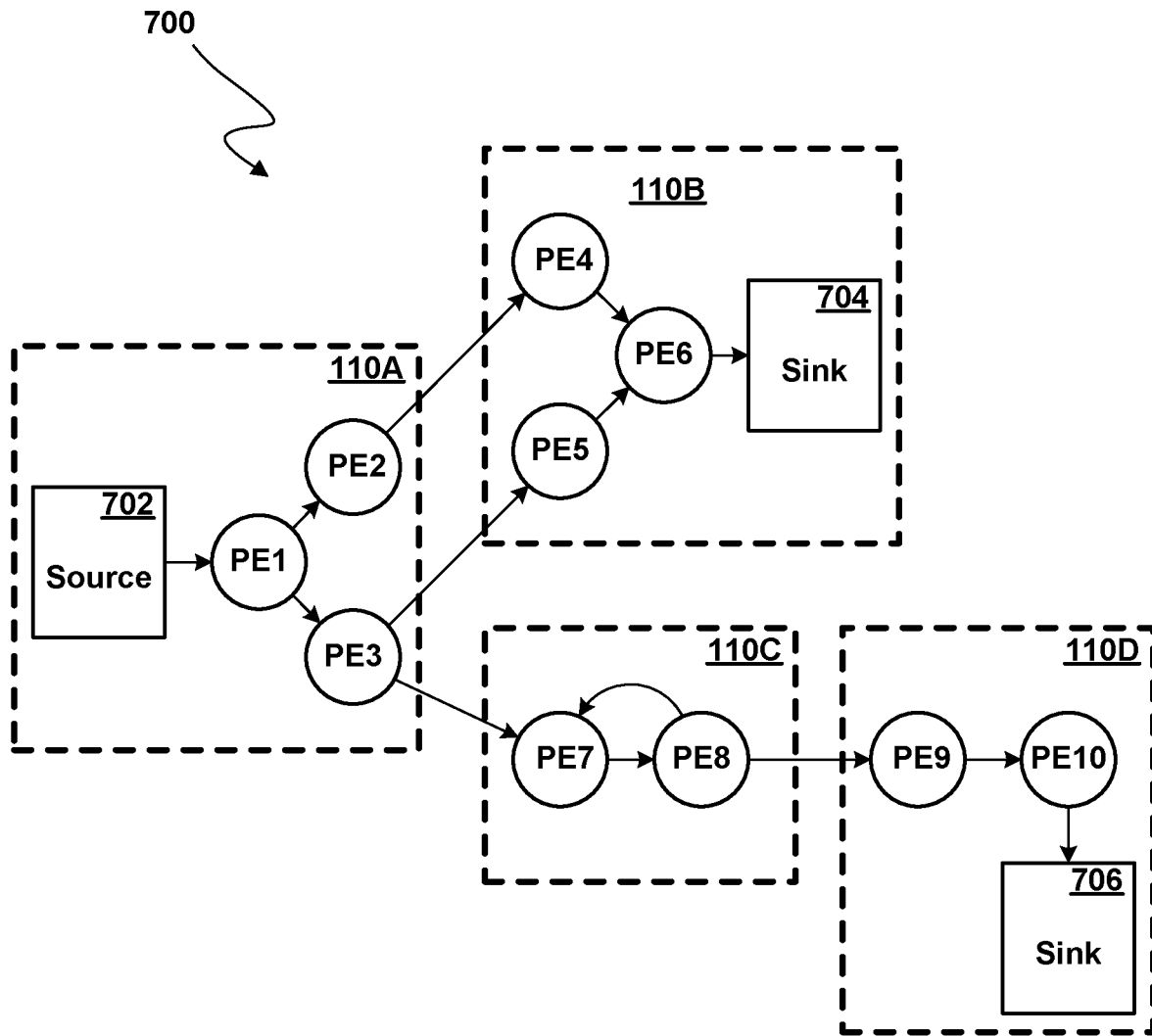
FIG. 7 illustrates an operator graph for a stream computing application according to various embodiments.

FIG. 7 illustrates an exemplary operator graph 700 for a stream computing application beginning from one or more sources 702 through to one or more sinks 704, 706, according to some embodiments. This flow from source to sink may also be generally referred to herein as an execution path. In addition, a flow from one processing element to another may be referred to as an execution path in various contexts. Although FIG. 7 is abstracted to show connected processing elements PE1-PE10, the operator graph 700 may include data flows between stream operators 312 (FIG. 3) within the same or different processing elements. Typically, processing elements, such as processing element 311 (FIG. 3), receive tuples from the stream as well as output tuples into the stream (except for a sink—where the stream terminates, or a source—where the stream begins). While the operator graph 700 includes a relatively small number of components, an operator graph may be much more complex and may include many individual operator graphs that may be statically or dynamically linked together.

The example operator graph shown in FIG. 7 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 700 begins at a source 702 and ends at a sink 704, 706. Compute node 110A includes the processing elements PE1, PE2, and PE3. Source 702 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 704. Similarly, tuples flowing from PE3 to PE5 also reach the operators in sink PE6 704. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 706. Typically, the sinks 704,706 output data (e.g. tuples) externally of the data streaming application (e.g., to a database, storage file, or other destination); however, it is possible for any of the processing elements to output data externally as well.

Processing elements 311 (FIG. 3) may be configured to receive or output tuples in various formats, e.g., the processing elements or stream operators could exchange data marked up as XML documents. Furthermore, each stream operator 312 within a processing element 311 may be configured to carry out any form of data processing functions on received tuples, including, for example, writing to database tables or performing other database operations such as data joins, splits, reads, etc., as well as performing other data analytic functions or operations.

The stream manager 134 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 7 illustrates execution paths between processing elements for the sake of clarity.

Database Components

Figure 8:
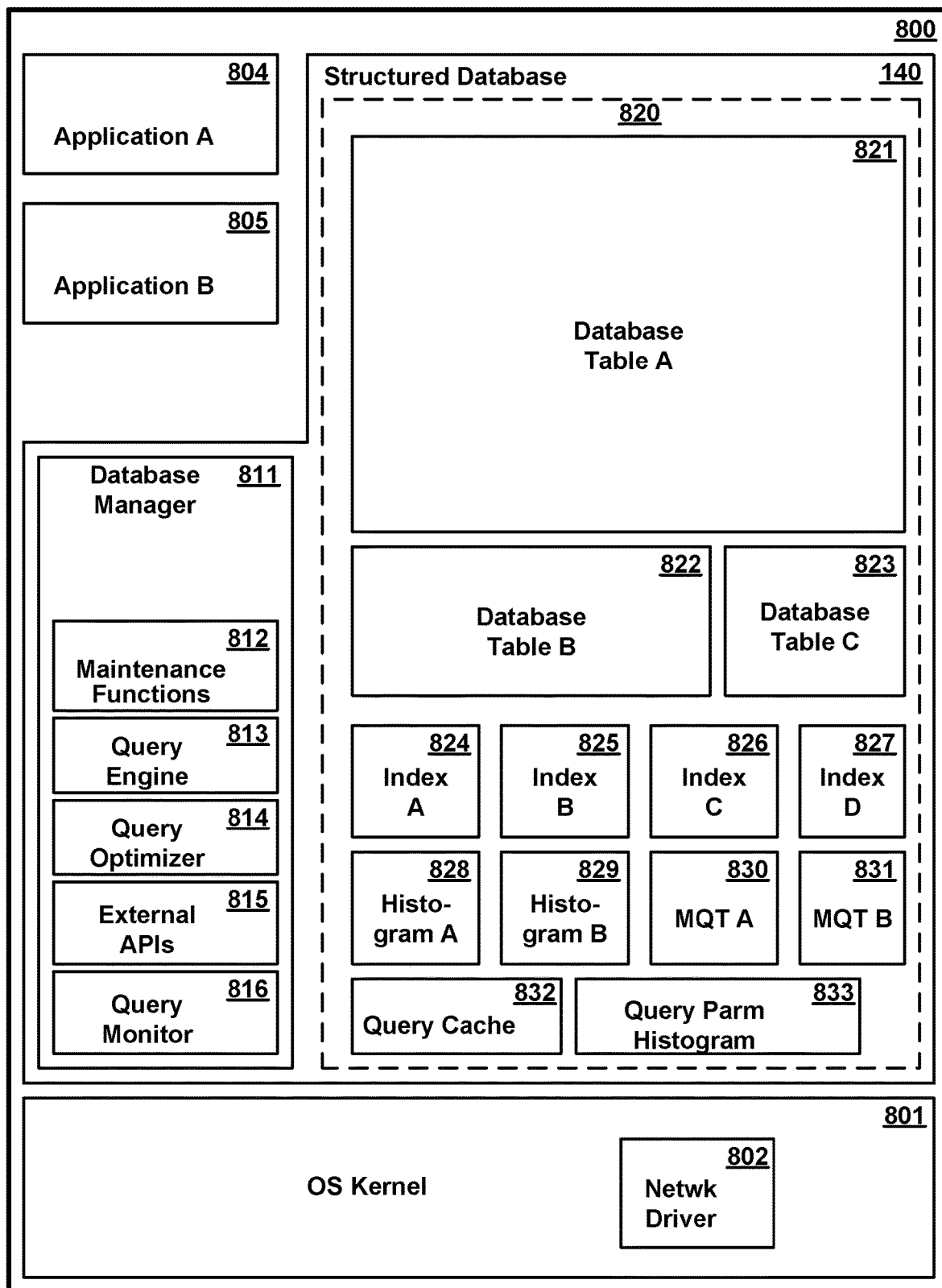
FIG. 8 is a conceptual illustration of the major software components in memory of a database server computer system, according to various embodiments.

In accordance with one or more embodiments, tuples output by operator graph 700, whether from one of sinks 704, 706, or from some other processing element, are entered into one or more tables of a structured relational database 140. FIG. 8 is a conceptual illustration of the major software components in memory 800 of a database server computer system 115 of FIG. 1 for accessing a structured relational database 140, according to various embodiments. As shown in FIG. 8, a database server computer system memory contains an operating system kernel 801 and structured database 140 including a database manager 811, one or more database tables 821-823, and one or more metadata structures 824-833.

Operating system kernel 801 is executable code and state data providing various low-level software functions, such as device interfaces, management of memory pages, management and dispatching of multiple tasks, common services for application programs, etc. as is well known in the art. In particular, OS kernel 801 preferably includes one or more network adapter drivers 802 for handling communications with one or more networks, including network 120, via network interface(s) 213.

Database tables and metadata 820 include one or more tables 821-823 (of which three are shown for illustrative purposes in FIG. 8, it being understood that the number may vary). As is known in the database art, a database table is a data structure logically in the form of a table having multiple records (also called entries or tuples), each record having at least one, and usually multiple, fields (also called attributes). The "rows" of the table correspond to the records, and the "columns" correspond to the fields. Although tables 821-823 are data structures which are logically equivalent to tables, they may be arranged in any suitable structure known in the database art. Database tables 821-823 might contain almost any type of data which is useful to users of a computer system.

Figure 9:
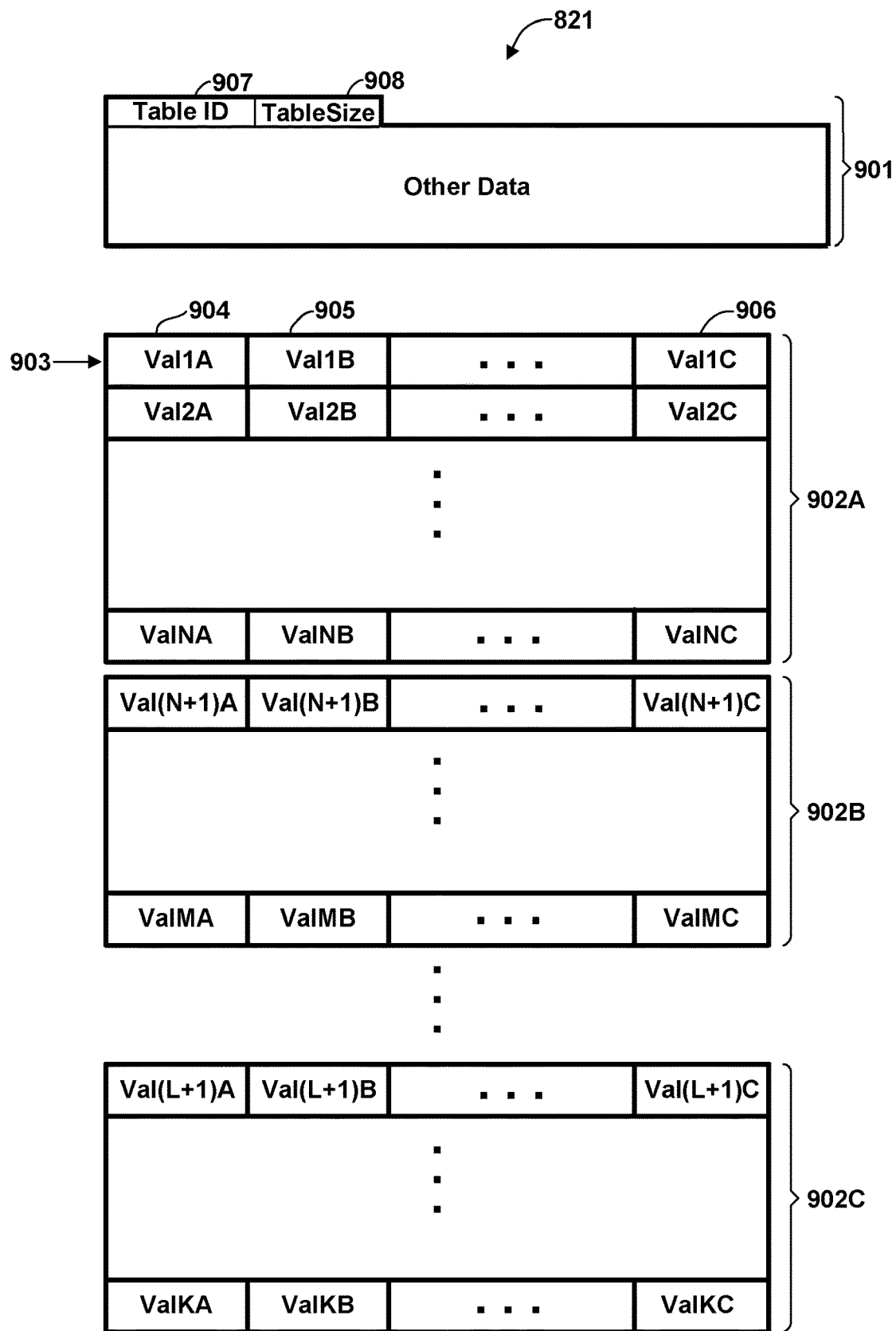
FIG. 9 is a conceptual representation of the structure of a database table, according to various embodiments.

FIG. 9 is a conceptual representation of the structure of a database table 821, according to one or more preferred and/or optional embodiments, it being understood that tables 822, 823 could have similar structure. Referring to FIG. 9, table 821 includes a header portion 901 and one or more table partitions 902A,902B,902C (herein generically referred to as feature 902). Each table partition 902 contains multiple records 903 (also called rows, entries, or tuples), each record 903 containing multiple data values logically organized as multiple fields 904-906. A large database table will typically have multiple partitions 902, each partition containing a respective disjoint subset of the records of the database table as a whole, although smaller tables may have only a single partition. Each database table partition 902 is conceptually represented in FIG. 9 as a table or array, in which the rows represent database records, and the columns represent database fields. However, as is known in the art, the actual structure of the database table in storage may vary due to the needs of data organization accommodating database updates, and so forth. A database table may occupy non-contiguous blocks of storage; database records may vary in length; some fields might be present in only a subset of the database records; and individual entries may be non-contiguous.

Associated with database table 821 is header portion 901. Header 901 is in fact data separate from the collection of records 903, and may be considered part of the database table 821 or may be considered a separate data structure. The header may or may not be stored in locations contiguous to the records 903. Header contains data for identifying the contents of the table, where it is located (e.g., pointers, arrays and other structures which identify the locations of the various partitions 902), certain essential parameters of the table, and so forth. In particular, in accordance with one or more embodiments, header 901 contains a table identifier 907 and a current table size 908 (i.e., the number of record currently in table 821). In accordance with one or more embodiments, the header further contains various other data useful for managing the table.

Associated with the database tables are one or more auxiliary data structures 824-833, also sometimes referred to as metadata (of which nine are represented in FIG. 8, it being understood that the number and type of such structures may vary). Auxiliary data structures characterize the structure of the database and data therein, and are useful in various tasks involved in database management, particularly in executing queries against the database. Examples of auxiliary data structures include database indexes 824-827, histograms 828-829, and materialized query tables (MQT) 830-831). Auxiliary data structures may further include a query cache 832 in which data regarding previously executed queries (the query itself, query execution plan or execution strategy, run-time statistics from execution, etc.) is stored. In one or more embodiments, auxiliary data structures further include query parameter histogram data 833 characterizing recent queries, in particular the values or ranges of data used as parameters of recent queries and their respective frequencies of use. Although a particular number and type of auxiliary database structures is illustrated in FIG. 8, it will be understood that the number and type of such structures may vary, that not all illustrated structures may be present, and/or that additional structures not shown may be present.

Database manager 811 comprises executable computer programming code which executes on CPU(s) 201 of database server system 115 to provide basic functions for the management of database 140. Database manager 811 may theoretically support an arbitrary number of database tables, which may or may not have related information, although only three tables are shown in FIG. 8. Database manager 811 preferably contains administrative maintenance functions 812 which automatically perform certain functions to manage the database and/or allow authorized users to perform basic administrative operations with respect to the database, such as defining and editing database table definitions, creating, editing and removing records in the database, viewing records in the database, defining database auxiliary data structures such as indexes and materialized query tables, views, and so forth. Administrative functions may further include logging of database transactions, recovery of data, and so forth. Certain of these functions may be available only to system administrators and the like, while others are available to clients.

Database manager 811 preferably further includes a query engine 813 for executing queries against data in database tables 821-823 and a query optimizer 814 for generating optimized query execution plans for use by query engine 813 in executing queries. Database manager 811 further preferably includes an external interface 815 having one or more application programming interfaces (APIs) by which external applications can access data in database 140 either by invoking query engine 813 or through other means.

In one or more embodiments, database manager 811 further includes a query monitoring function 816. Query monitoring function 816 monitors queries submitted against data in database 140 to identify data of interest to the database. For example, particular subjects or ranges of numerical values of a particular field may appear frequently in recent queries, indicating that any input data which contains the same values is potentially of greater interest than other input data. Query monitoring function 816 analyzes the queries to generate query parameter histogram data 833 summarizing the values or ranges of data which are the subject of recent queries.

Database manager 811 may further contain any of various more advanced database functions, as are known in the art. Database manager could be a generic database management system, such as one implementing a structured query language (SQL) query protocol, but it might alternatively query and structure data according to some other protocol and/or might be a custom designed database management system. Although database manager 811 is shown and described herein as an entity separate from operating system kernel 801, it will be understood that in some computer architectures various database management functions are integrated with the operating system.

Although one database 140 having three database tables 821-823 and ten auxiliary structures 824-833 are shown in FIG. 8, the number of such entities may vary, and could be much larger. A computer system or a group of computer systems may contain multiple databases, each database may contain multiple tables, and each database may have associated with it multiple indexes, MQTs, histograms, views, volatility records, and/or other auxiliary data structures not illustrated. Alternatively, some entities represented in FIG. 8 might not be present in all databases. Additionally, database 140 may be logically part of a larger distributed database which is stored on multiple computer systems. Although database manager 811 is represented in FIG. 8 as part of database 140, the database manager, being executable code, is sometimes considered an entity separate from the "database", i.e., the data 820.

In addition to operating system 801 and database 140, memory of database system 800 may include all or selective portions of one or more user applications 804-805. User applications 804-805 are applications which execute on CPU(s) 201, and may access data in database 140 to perform tasks on behalf of one or more users. Such user applications may include, e.g., sales transactions, inventory management, personnel records, accounting, code development and compilation, mail, calendaring, or any of thousands of user applications, and may be web-based (i.e., present web pages to a remote client for rendering in the client's browser) or provide some other form of user interface. Some of these applications may access database data in a read-only manner, while others have the ability to update data. There may be many different types of read or write database access tasks, each accessing different data or requesting different operations on the data. For example, one task may access data from a specific, known record, and optionally update it, while another task may invoke a query, in which all records in the database are matched to some specified search criteria, data from the matched records being returned, and optionally updated. Furthermore, data may be read from or written to database tables 811-813 directly, or may require manipulation or combination with other data supplied by a user, obtained from another database, or some other source. Applications 804-805 typically utilize function calls to database manager 811 through external APIs 815 to access data in the database, and in particular, to execute queries against data in the database, although in some systems it may be possible to independently access data in the database directly from the application. Although two applications 804-805 are shown for illustrative purposes in FIG. 8, the number of such applications may vary.

Various software entities are represented conceptually in FIGS. 3-9 as being contained in respective memories of any of the various systems or devices described herein. However, as is well known, the memory of a computer or other digital device is typically insufficient to hold all software entities and other data simultaneously, and selective portions of software entities or other data are typically loaded into memory from storage as required. Furthermore, various software entities are represented in FIGS. 3-9 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representations of FIGS. 3-9, it will be understood that the actual number of such entities may vary, and in particular, that in a complex data streaming and/or database environment, the number and complexity of such entities is typically much larger. Additionally, although certain software components are depicted in within respective single systems for completeness of the representation, it is not necessarily true that all programs, functions and data will be present in a single system, and may be present in another partition on the same computer system or in a different computer system. For example, user applications

804-805 which call APIs to access the database may be on a separate system from certain maintenance functions such as defining the database, adding or deleting metadata structures, and so forth. Finally, it will be understood that the conceptual representations of FIGS. 3-9 are not meant to imply any particular memory organizational model, and that a computer system hosting a data streaming application or a database might employ a single address space virtual memory, or might employ multiple virtual address spaces which overlap.

Collection of Data Streaming Profile Data

In accordance with one or more embodiments, profile data is collected which characterizes the operation of the data streaming application. This profile data is then used to correlate instances of tuples exiting the data streaming application (e.g., via a sink 604,606, or otherwise) to be appended to a database table 821-823 of database 140 with previously occurring tuples in the operator graph. These previously occurring tuples may have specified attribute values and/or exist at specified locations in the operator graph. Responsive to identifying data of interest in tuples exiting the data streaming application and being appended to a database table, these previously occurring tuples can be identified and selected for special processing by the data streaming application. In particular, in one or more embodiments, special processing by the data streaming application includes processing at an increased priority level to cause the resultant data to enter the database sooner that would otherwise occur. In one or more additional or alternative embodiments, special processing by the data streaming application may include additional or enhanced handling of data, such as processing of images in a non-lossy or less lossy manner, using image enhancement and/or image recognition techniques, translation of textual matter into one or more other languages, encryption of data, and so forth. The profile data may additionally be used for other purposes, including prediction that exiting tuples of a particular type and/or having particular attribute values will be added to the database.

In one or more embodiments, profile data is obtained by tracing the execution of one or more execution instances of the data streaming application, although other or additional forms of profile data might be used, such as input and output data or data obtained from analysis of the source code. Tracing is a well-known technique whereby the occurrence of pre-defined traceable events during execution of a computer program causes the computer to save certain state data showing the state of the computer at the time the traceable event occurred. It is typically used during computer program code development, to debug errors, determine frequently used code paths, identify performance bottlenecks, and so forth.

Tracing may be accomplished by "instrumenting" the code to be traced, i.e., placing trace instructions ("instrumentation") at various code location which, when encountered during execution of the computer program, cause the desired state data to be saved. A trace instruction could cause data to be saves unconditionally (every time the instruction is encountered), or conditionally based on some state value(s). The exact mechanism whereby the state data is saved may vary. The tracing instrumentation could be in-line instructions in the code, or a call to a separate routine, or an instruction which triggers an interrupt.

In one or more embodiments, the trace instructions 615 (instrumentation) are contained in at least one version of the common run-time code 614 used by computer 136 to generate the data streaming program. There could, in fact, be multiple versions of the common run-time code, including one without any instrumentation. There could also be multiple different instrumented versions for collecting different types of profile data. Instrumentation in the common run-time code simplifies the process of developing a data streaming application by avoiding the need for developers of each different data streaming application to create their own instrumentation, and standardizes the collection and analysis of profile data.

The common run-time code 614 typically contains routines in which traceable events occur. Specifically, in one or more embodiments, common run-time code 614 will include routines for allocating a new tuple in the data streaming application, for sending a tuple from one processing element to a next processing element, and for outputting a tuple to the database. Additional routines which may be of interest in tracing tuples in accordance with one or more embodiments may include routines for copying or duplicating a tuple, for deleting a tuple, for changing the definition of a tuple (its fields, field lengths, etc.) and so forth. In one or more embodiments, any or all of these events might be traceable events which cause the collection of trace data, and appropriate instrumentation is placed in the corresponding routines which perform the operation.

Figure 10:
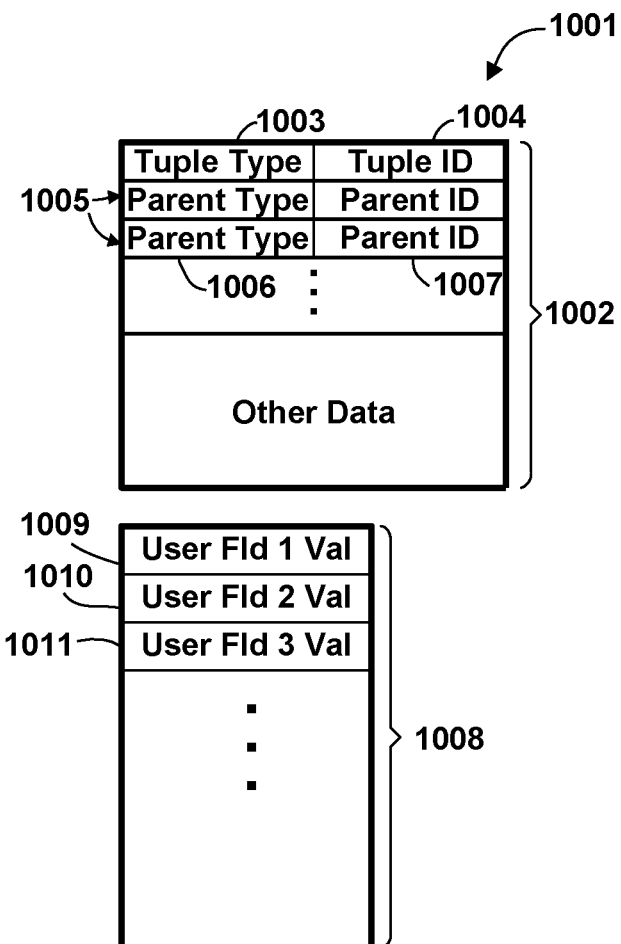
FIG. 10 is a conceptual representation of an altered tuple of a data streaming application altered for supporting profile analysis, according to various embodiments.

In one or more embodiments, the instrumented version(s) of common run-time code 614 alter the structure of the tuples used in the data streaming application by adding additional data useful in trace analysis. FIG. 10 is a conceptual representation of an altered tuple 1001 of a data streaming application, altered for supporting profile analysis of trace data, according to various embodiments. Referring to FIG. 10, tuple 1001 includes a header 1002 containing a tuple type 1003, a unique tuple identifier 1004, and a variable number of parent pairs 1005, each parent pair comprising a respective parent tuple type 1006 and parent tuple identifier 1007. The header may contain other data. The tuple further contains a body portion 1008 having a variable number of user data fields 1009-1011 as defined by the data streaming application, of which three are illustrated in FIG. 10, it being understood that the number of such user data fields may vary. The tuple type 1003 is the name of a set of tuples having a common defined structure, corresponding roughly to a table name of a database table containing multiple tuples (also called records or rows). The tuple identifier 1004 and parent pairs 1005 are additional fields which are added by the instrumented version of the common run-time code 614. These fields are used internally by the data streaming application for trace analysis and/or other purposes, and need not be visible to the user of the application.

In the instrumented version of the common run-time code, any routine which creates a new tuple automatically allocates the above described fields and assigns a unique tuple identifier 1004, similar to a unique serial number, to the newly created tuple. If the newly created tuple is created from or copied from an existing tuple (parent tuple), the tuple type and unique tuple identifier of the parent tuple are copied into a parent pair 1005 of the new tuple as the parent tuple type 1006 and parent tuple identifier 1007, respectively. Since there could be a chain of multiple parents, all parent pairs 1005 in the immediate parent are also copied into respective parent pairs 1005 of the newly created tuple.

Figure 11:
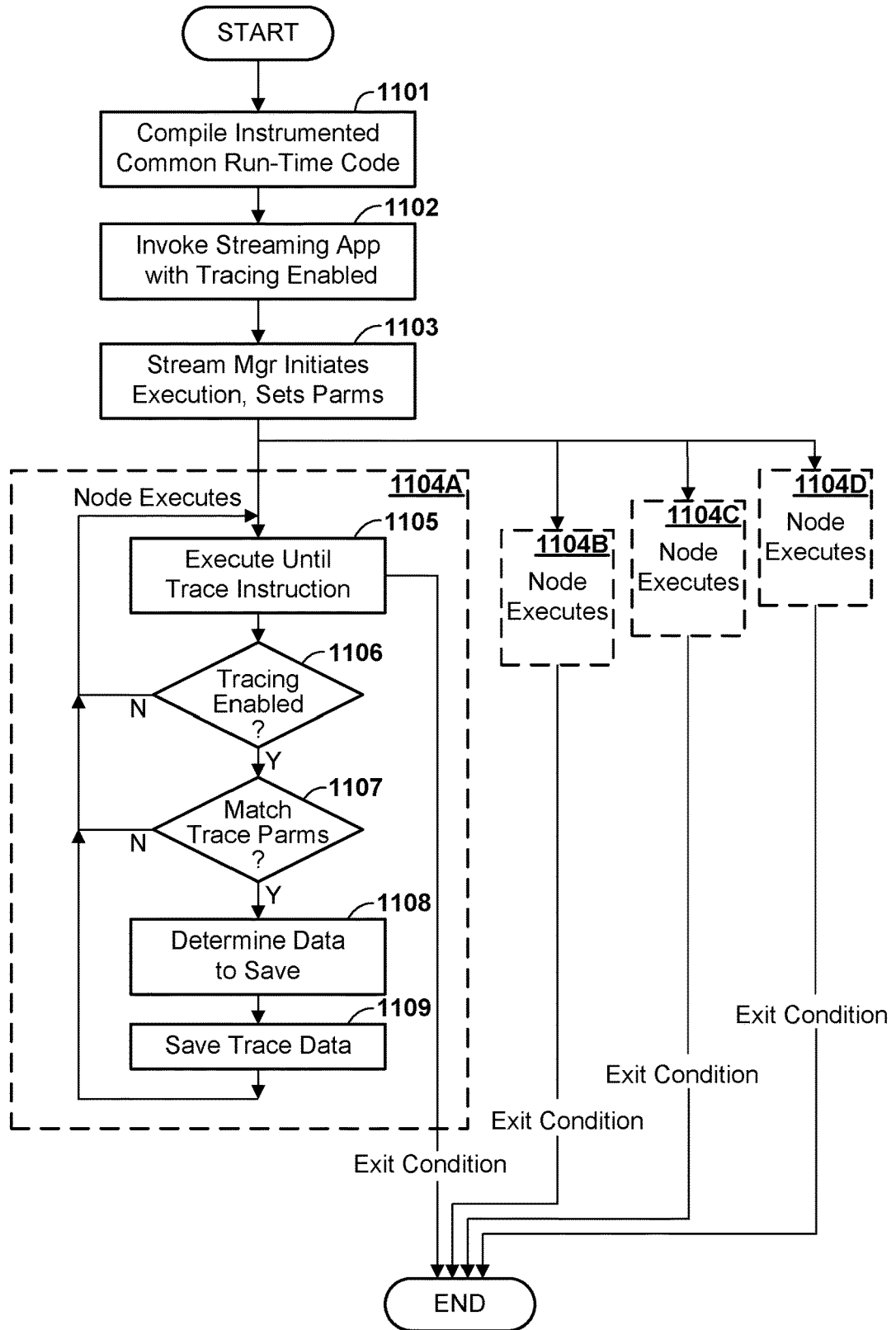
FIG. 11 is a flow diagram illustrating at a high level a process of collecting profile data for a data streaming application, according to various embodiments.

FIG. 11 is a flow diagram illustrating at a high level a process of collecting profile data for a data streaming application, according to various embodiments. Referring to FIG. 11, the instrumented code is compiled by compiler 136 (block 1101). Compilation represented at block 1101 could be either static or dynamic compilation. If statically compiled, the user would direct compilation with instrumentation at compile time, by specifying use of an appropriate instrumented version of the common run-time code, or if supported, by a special compiler directive or option to use the instrumented version. If dynamically compiled at run time, the user invoking execution of the data streaming application specifies the code files (e.g., source or intermediate code) including any instrumented version of the common run-time code. Responsive to the appropriate directive, compiler 136 compiles the data streaming application (either statically or dynamically, as the case may be) to incorporate the tracing instructions.

The data streaming application is invoked for execution with tracing enabled, and any optional tracing parameters are specified (block 1102). Although block 1102 is represented in FIG. 11 as following block 1101, is will be understood that in certain dynamic compilation environments, compilation may occur after the data streaming application is invoked for execution.

In one or more embodiments, the instrumentation instructions, being in the common run-time code, are not specific to any particular data streaming application and therefore not specific to any particular type of tuple or set of tuple types. For example, a common run-time routine which sends a tuple from one processing element to a next processing element could include a tracing instructions which trigger whenever a tuple (of any type) is sent. If the user wishes to trace a particular type of tuple or set of tuple types, the user specifies the tuple(s) to be traced as an optional tracing parameter when the data streaming application is invoked. When the trace instructions are triggered, the code determines whether the tuple being operated on by the corresponding common run-time routine is of the type which should be traced, and saves trace data accordingly. Additional run-time tracing options are possible. For example, it may be desirable to trace only some if the possible traceable events or paths through the operator graph. While generic trace instructions may exist in the common run-time code making it possible to trace all paths through the operator graph, the user may specify particular paths to be traced or otherwise limit the events to be traced.

Accordingly, when the data streaming application is invoked for execution at block 1102, the user may specify any tracing parameters. The user may have the option to disable tracing entirely for performance reasons. To collect trace data for use in analyzing the execution profile of the data streaming application and generating operator graph profile data 525 including profile summary data 526, tracing is preferably enabled and trace data for one or more tuple types of interest is saved whenever a tuple of the corresponding type is created, is sent from one processing element to another, or is output to the database. Additional events may optionally be traced.

Stream manager 134 responds by initiating execution in the various compute nodes 110 and initializing any environmental parameters, including environmental parameters governing tracing (block 1103). For example, a trace enable flag may be set, and bit masks or other data structures may be initialized to control tracing for the desired events to be traced, trace data to be collected, and so forth.

The data streaming application executes concurrently in each of the compute nodes 110 and in the management system 105, represented in FIG. 11 as blocks 1104A-D. Actions within each node or management system are illustrated only in block 1104A for clarity of representation, it being understood that these are similar in blocks 1104B-D.

Within each node (or management system), the data streaming application code executes, possibly in multiple concurrent threads (represented in simplified form as block 1105), until a trace instruction is encountered. The trace instruction causes a check whether tracing is enabled (block 1106). If not, the 'N' branch is taken from block 1106, and execution resumes. If tracing is enabled, trace code determines whether the event and the current state data match the tracing parameters which were specified when execution was invoked (block 1107). For example, if particular events such as tuple creation, tuple transmission from one processing element to another, and/or tuple output are to be traced, the trace code verifies that the trace instruction causing temporary halt in execution came from one of these events; if tracing of a particular tuple type was specified, the trace code verifies that the tuple associated with the trace event is of the specified type; and so forth. If the event/state data do not match the specified tracing parameters, the 'N' branch is taken from block 1107, and execution resumes; otherwise, the 'Y' branch is taken, and the trace code determines the extent of trace data to be saved (block 1108). Almost any data could be saved in a trace, but in one or more embodiments, the saved trace data includes a copy of the tuple associated with the traceable event and the location in the operator graph at which the tuple was at the time of the traceable event. This data is then saved in the local trace data 318, or, if the trace instructions are executing in the management node, in management node trace data 527 (block 1109).

At some point, an exit condition is encountered during execution, causing execution of the program to end, as indicated by the flow line to the END block. Such an exit condition could be, e.g., completion of procession all data, an interrupt, an error condition, or other exit condition.

Profile trace data could be collected by tracing during one or multiple execution instances of the data streaming application, and might be refined or periodically updated over time as more is learned about the behavior of the data streaming application or as changes to the application code or the data upon which it typically operates cause changes to the application's behavior.

Generation of Profile Summary Data

In accordance with one or more embodiments, the collected profile data is analyzed using profile data analyzer 523 in management system 105 to produce a set of profile summary records 526. The profile summary records correlate specific tuple types occurring at specific locations within the operator graph with tuple types which are output to the database, and identify any "stable" fields, which do not change value. The profile summary records may optionally contain additional data, such as some measure of the number of output tuples of particular type which can be projected to be produced.

FIG. 12 is a conceptual illustration of the structure of an exemplary set of profile summary records 526, according to various embodiments. These records characterize previously observed flows of tuples within the data streaming application, and may be used, among other things, for identifying selective data tuples of interest to be processed differently by the data streaming application, as by enhancing the processing priority or otherwise changing the manner in which the tuples are processed.

Referring to FIG. 12, the profile summary data 526 contains multiple records 1201, each record corresponding to a single type of tuple, its location within the operator graph 132, and type of tuple which may be output to the database as a result. Each record 1201 in the profile summary data contains an output tuple type field 1202 specifying the type of tuple which is output to the database, a graph location field 1203 specifying the location within the operator graph to which the corresponding record pertains, and an internal tuple type field 1204 specifying the type of tuple which is temporarily held at the corresponding location within the operator graph. It is possible that the output tuple type specified in field 1202 will be the same as the internal tuple type specified in field 1204.

In one or more embodiments, the profile summary record 1201 further includes a variable number of stable field identifier pairs 1205, each specifying a respective output stable field 1206 and corresponding internal stable field 1207 of a stable field pair. As used herein, a "stable field pair" is an ordered pair of fields, one field of the pair in the internal tuple, and another in the output tuple, in which the value of the field in the output tuple is derived directly from the value of the field in the internal tuple without modification. Knowledge of stable field pairs can be used to identify data of interest where the data of interest includes only tuples have a specific value, values or range of values in one or more key fields.

In one or more optional alternate embodiments, profile summary record 1201 further includes a key field identifier 1210 specifying a key field within the internal tuple type specified in field 1204, and a variable number of key field specifics 1211, each specific specifying a corresponding minimum value 1212, a corresponding maximum value 1213, and a corresponding expectation value 1214. Optional fields 1210-1214 specify an expectation value for a particular tuple at a particular graph location having a particular key value of the key field. This information may be used, among other things, to project data which will be input to the database, as further described in commonly assigned U.S. patent application Ser. No. 15/339,772, filed Oct. 31, 2016, which is herein incorporated by reference. Additionally or alternatively, it may be used in conjunction with the logical expressions or other parameter(s) defining data of interest produced by the database query monitor 816 to adjust processing priorities of selective data in the data streaming application or otherwise modify the manner in which selective in-flight data is processed.

The data collected by tracing may be analyzed in any of various ways to produce profile summary records 526. Conceptually, the analysis amounts to determining, for each tuple output to the database, for each location the tuple or a parent tuple passed through in the operator graph, the fields of the tuple or parent tuple which remained stable from the respective location until output of the tuple (or child of the tuple) to the database. Additional statistical data may optionally be summarized.

Figure 13:
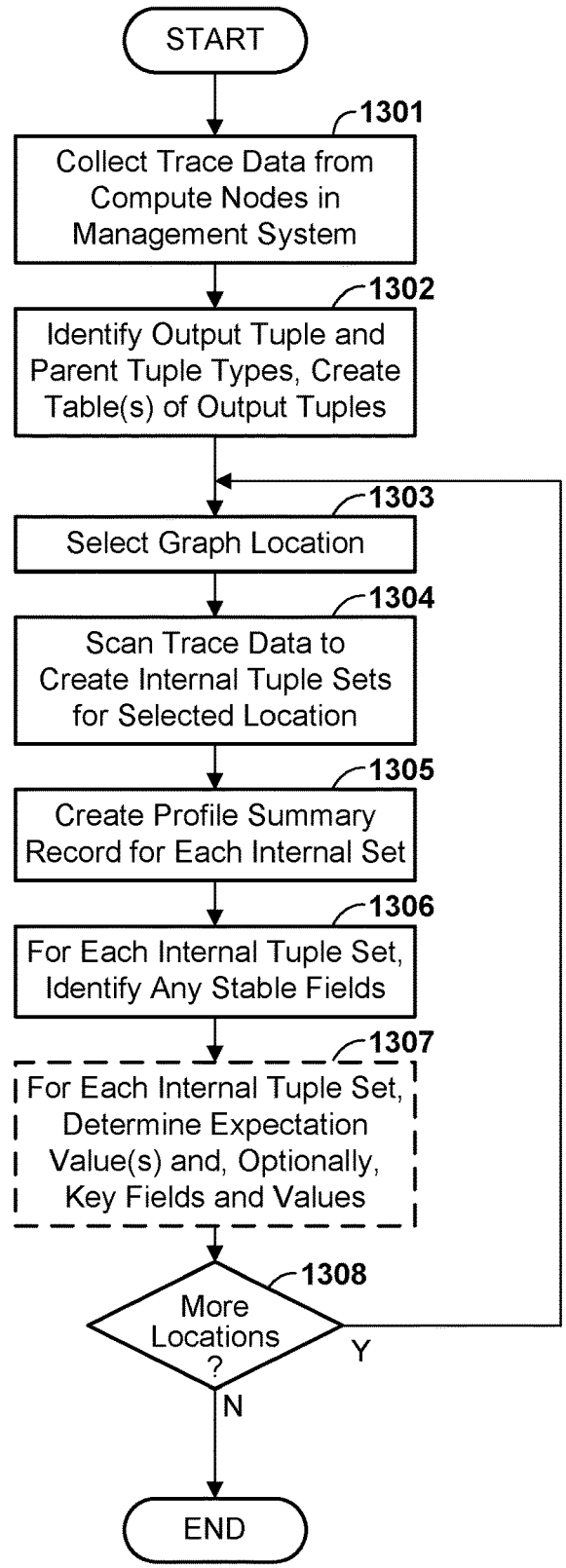
FIG. 13 is a flow diagram illustrating at a high level a process of analyzing profile data to produce a set of profile summary records, according to various embodiments.

FIG. 13 is a flow diagram illustrating at a high level a process of analyzing profile data to produce a set of profile summary records 526, according to various embodiments. This analysis is performed by or under the control of profile data analyzer 523 in management system 105.

Referring to FIG. 13, trace data collected in the various nodes and stored in respective local node trace data caches 318 of compute nodes 110 is transmitted to the management system 105 for analysis (block 1301). Collection of trace data in the management system is shown as a single block for simplicity of representation. It would in fact be possible to transmit all trace data to the management system at the beginning of analysis, as represented in FIG. 13. Alternatively, profile data analyzer 523 in management system 105 may request trace data in increments from the various compute nodes 110 as the analysis is performed. This latter approach would off-load some of the screening work to the compute nodes. For example, the management system may determine that only specific tuple types at specific locations generate output to the database, and accordingly request only those tuple types, thereby reducing consumption of network bandwidth during analysis, and reducing the burden on the management system of scanning a great deal of trace data which is ultimately not used.

The tuple type or types which are output to the database are identified, the parent tuple type(s), if any, of each tuple type which is output to the database are identified, and one or more tables are generated of all tuples output to the database during the trace (block 1302). The order of these actions may vary, depending on how the determinations are made. In some embodiments, it is possible that the output tuple types are known or determined from external commands received from the database, or by analysis of source code. However, for a generic application, it would always be possible to scan all the trace data, identify all tuples which are in fact output to the database during the trace data collection, and construct a list of tuple types which are output to the database from this data. Similarly, the parent types, if any, might be determined by analysis of source code or from external command, but for a generic application, it would always be possible to extract a list of parent tuple types by examining parent type fields 1006 of the output tuples. The table(s) of tuples, although referred to as tables, may be any convenient data structure for performing the analysis herein. All tuples of the same type which are output to the database constitute an output tuple set. Preferably, each output tuple set is placed in a separate respective table or other data structure. The table(s) of tuples output to the database may be indexed to assist further analysis, e.g., according to tuple identifier 1004.

For each location in the operator graph, the trace data is analyzed to produce a corresponding one or more profile summary records 1201. This is represented in FIG. 13 as blocks 1303-1308, by selecting a location in the operator graph (block 1303) and analyzing each location in turn. However, it will be appreciated that multiple actions may be performed concurrently by multiple threads of execution or otherwise. A "location" can be any subset of the operator graph in the data streaming application in which tuples might be temporarily held and at which they are traced. In one or more embodiments, the "locations" are processing elements in the operator graph, although the granularity of locations could be compute nodes, operators, or some other entity.

For the selected location, the tuples traced from that location are scanned to identify one or more sets of tuples (referred to herein as internal sets), each internal set corresponding to a tuple type of one of the output tuple sets, or a parent tuple type of the tuples in an output tuple set (block 1304). A corresponding profile summary record 1201 is generated for each such set (block 1305), the output tuple type 1202 being set to the corresponding type of the output tuple set, the graph location 1203 being set to the selected location, and the internal tuple type 1204 being set to the tuple type of the tuples in the internal tuple set.

For each internal tuple set, any stable fields are identified, and for each stable field, a corresponding stable field pair 1205 is added to the profile summary record 1201 (block 1306). It may be possible to identify stable fields from analysis of the source code, but for a generic application, stable fields may be identified by comparing the tuples in the internal set with the tuples in the corresponding output tuple set, even where the field names and/or internal and output tuple types are different. This may be done by scanning the entire set of internal tuples; for each internal tuple, determining whether a corresponding output tuple exists in the output tuple set (i.e., having the same tuple ID 1004 if the tuple types are the same, or having a parent tuple ID 1007 and parent type 1006 which are the same as the tuple ID 1004 and tuple type 1003 of the internal tuple); and if so, for the first such tuple pair found, creating a list of all field pairs for which the value of the field in the output tuple is the same as the value of the field in the input tuple; and for all subsequent pairs of an internal and an output tuple found, removing any field pair from the list if the values of the respective fields in the two tuples of the pair are not identical. Any field pairs remaining at the end of the scan are considered stable fields, and the corresponding field names in the output tuple and internal tuple of each such pair are recorded in a new stable field pair 1205 as stable field output 1206 and stable field internal 1207, respectively.

In one or more optional embodiments, for each internal tuple set from the selected location, one or more expectation values are determined and recorded in the profile summary record (represented as block 1307 in dashed lines). A single expectation value for the profile summary record may be derived as the quotient of the number of tuples in the corresponding output tuple set divided by the number of tuples in the internal tuple set. It would alternatively be possible to record the expectation value as a pair of integers corresponding to the count of tuples in the output tuple set and count of tuples in the internal tuple set. In one or more additional embodiments, multiple expectation values are determined, each corresponding to some range of values of one or more key fields. The key field(s) could be specified by some external command to the stream manager, or could be determined by the profile data analyzer 523 by analyzing the trace data. Specifically, any of various analytical techniques or tools could be used for finding correlations in data. In this case, the correlation sought is any correlation between a key field value and the expectation of producing an output tuple.

In accordance with one or more of such optional embodiments, profile data analyzer 523 scans the internal tuple set and output tuple set to find key values or ranges of key values, if any, which correlate to a significantly higher or lower expectation value than the expectation value for the internal tuple set and output tuple set as a whole. In this case, the expectation value corresponding to a key value or key value range is expressed as the quotient having a divisor equal to the number of internal tuples in the internal tuple set having a specified key value or key value within the specified range, and a dividend equal to the number of tuples in output tuple set which are produced by any of the tuples counted in the divisor, i.e. which have a tuple ID 1004 or a parent tuple ID 1007 equal to the tuple ID of a tuple in the internal tuple set which has a specified key value or key value within the specified range. If such a key field or key fields and value ranges are identified, the key field is saved as key field 1210 in the profile summary record, and each value or range of values of interest, and their corresponding expectation values, are saved as a respective key field specific 1211 having a respective minimum value 1212 of the corresponding key field, a respective maximum value 1213 of the corresponding key field, and a respective expectation value 1214 corresponding to the expectation value for the internal tuple type at the selected operator graph location when the key field value lies in the range specified by the minimum 1212 and maximum 1213 values.

If any more operator graph locations remain to be analyzed, the 'Y' branch is taken from block 1308 and a next graph location is selected for analysis. When all graph locations have been analyzed, the profile summary records have been generated and populated with data, and the analysis of profile data is complete.

It will be appreciated that in the above description and the illustration of FIG. 13, various actions are shown and described as being performed sequentially for ease of understanding. However, for greater system efficiency, it may be possible to perform many of these actions concurrently by combining multiple scans of trace data into a single scan. It will further be understood that the order of certain actions could be changed without affecting the result of generating profile summary records. Finally, it will be appreciated that many variations in the form of profile data used to analyze in-flight data of interest are possible, and that the profile summary records described herein represent only some of the possible forms of profile data which may be used. Profile records may have other or additional fields; may be based on data other than or in addition to trace data; may characterize data streaming application behavior in a different way; and so forth.

Monitoring Queries in the Database

In accordance with one or more embodiments, queries against data in the database are monitored to determine data of current interest to the query requestors. This data is then processed in some special manner in the stream computing application, for example, by increasing the processing priority of the data of interest and/or performing additional processing steps to enhance the data.

Data of interest might be anything storable in the database, and that is the subject of an unusually high level of interest as indicated by recent queries. For example, a general-purpose Internet search engine might observe a sudden and unusually large interest in a particular topic, such as a celebrity, a business entity, a public official, or the like, which could be triggered by a recent newsworthy event. In this case, any incoming data in a data streaming application which might be associated with the topic of interest could be processed with special priority so that it is available to meet the increased interest of the database users.

In order to identify data of interest, the queries against the database are continually monitored, histograms or similar metadata structures are updated with monitored query data, the metadata structures are periodically analyzed to identify query search terms and/or conditions of unusual interest, and one or more parameters defining the data of interest are generated. In one or more embodiments, the parameters defining the data of interest are meta-queries, which are logical expressions in the form of queries which define a particular subset of data in the stream computing application. A process of monitoring queries in the database to generate parameters defining data of interest is illustrated in FIG. 14.

Figure 14:
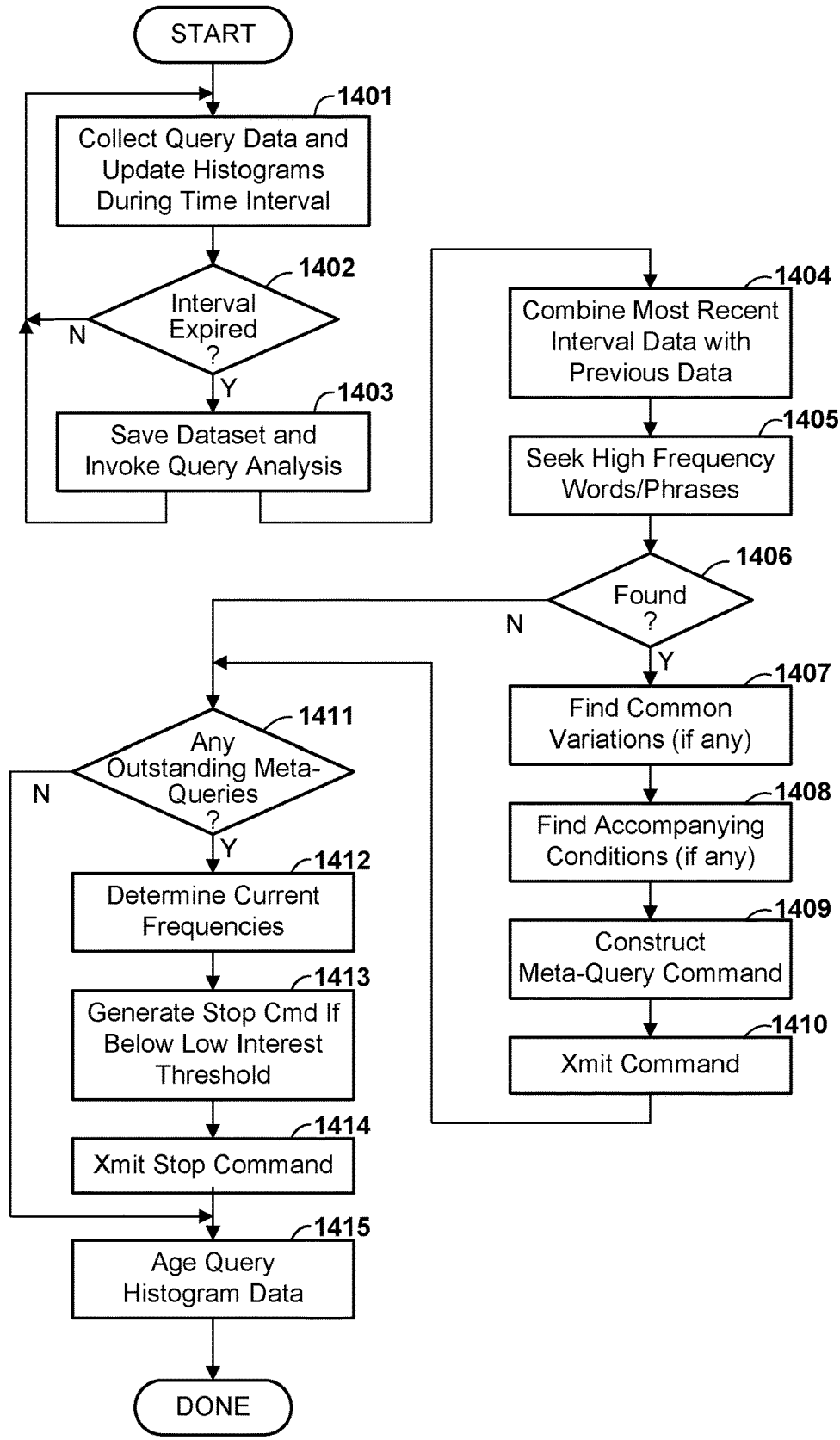
FIG. 14 is a flow diagram illustrating at a high level a process of monitoring queries in the database to generate parameters defining data of interest, according to various embodiments.

Referring to FIG. 14, query monitor 816 monitors queries during a time interval as they are received by database manager 811, and updates query parameter histogram data 833 as each query is received with the parameters of the respective query (block 1401). Query parameter histogram data 833 could include a respective count for each individual word in a search query as well as phrases or combinations of words, numbers, or special characters. Where the queries specify particular fields to search, query parameter histogram data may further include fields searched.

Query monitoring and data collection continues during a collection interval (represented by the 'N' branch looping from block 1402), and upon expiration of the collection interval, the 'Y' branch is taken from block 1402).

The collected dataset is saved and an analytical routine within query monitor 816 is invoked to analyze the query parameter histogram data and generate parameters defining data of interest (block 1403). Collection of monitored query data then continues for a next time interval, shown as the branch from block 1403 back to block 1401. The analysis of the query parameter histogram data proceeds from the just completed time interval, represented as blocks 1404-1412, proceeds in parallel with collecting monitored query data for a next time interval, since this process can take some time.

The collected query parameter histogram data from the just completed time interval is combined with suitably aged query parameter histogram data from previous time intervals to form composite query parameter histogram data for analysis (block 1404). Combining data generally means, among other things, that the frequency totals for each respective word or phrase are summed to obtain a composite total for the respective word or phrase, although data might be combined in some other manner.

Words or phrases in the histogram are analyzed to identify entries having unusually large frequencies of occurrence (block 1405). What constitutes an unusually large frequency may vary depending on the word or phrase. Common words, and some phrases which are common parts of speech, may be expected to occur normally with some frequency, and therefore may have a higher threshold than obscure words, proper nouns, or arbitrary phrases. However, the threshold chosen for a particular word or phrase should be sufficiently high that the word or phrase will not be chosen simply as a result of normal variation or "noise" in the usage of the word during a particular interval.

In one or more embodiments, respective typical frequencies of common words or phrases can be obtained by saving histogram data collected from actual queries during multiple time intervals. Preferably, such intervals are spaced apart random amounts to avoid possible statistical biases which may result from sampling at the same time of day or day of week, and to avoid transient effects of heavy usage of a particular word or phrase as a result of some recent event. Alternatively, known usage statistics derived from external sources may be used.

If no unusually high frequency words or phrases are found, the 'N' branch is taken from block 1406, and blocks 1407-1410 are skipped. If any unusually high frequency words or phrases are identified (the 'Y' branch from block 1406), the query parameter histogram data is further searched for common variations of the high frequency word or phrase (block 1407). For example, spelling variations or synonyms of a particular word may be substituted and searched for in the histogram data. If any such variations are found having a significant frequency of occurrence, these variations are associated with the high frequency word or phrase for purposes of constructing a meta-query command. In this case, the frequency of occurrence of the variant need not be as high as the "unusually high frequency" threshold used in block 1405, and may in fact be rather low, because it is the frequency of the main variation of the word or phrase which warrants special processing in the stream computing application.

If any unusually high frequency words or phrases are identified, the queries containing the high frequency word or phrase are analyzed, and any conditions which frequently occur in the same query are also identified (block 1408). For example, the queries may specify a particular field in which the high frequency word or phrase is to be found. As an additional example, the queries may contain a logical AND or OR condition associated with the occurrence of the high frequency word or phrase.

A meta-query command is constructed, the meta-query defining the data of interest as indicated by the unusually high frequency word or phrase and any variants (block 1409). The meta-query command contains a logical condition (which may be simple or compound, which may conform to an established query protocol, such as SQL, and which is either true or false when applied to a data structure, such as a data tuple, in the stream computing application. The meta-query command may further specify a special processing action to be performed by the stream computing application upon data meeting the specified logical condition. Thus, if a data tuple meets the logical condition expressed in the meta-query command, the tuple will be processed in the manner specified in the command by the stream computing application. Variants of the high frequency word or phrase, if any, identified in block 1407, would typically be expressed as logical OR conditions within the meta-query command. Additional conditions frequently occurring in the same query, identified in block 1408, may be expressed as logical AND conditions.

The specification of a special processing action in the meta-query command may be either explicit or implicit. For example, by default the stream computing application may process all tuples meeting the logical conditions of the meta-query command at a higher priority, processing at a higher priority being the "special processing action" in this case. Other or additional actions performed responsive to the meta-query command could include taking particular paths in the operator graph or otherwise causing additional actions to be performed with respect to data. For example, image data may be processed and saved at greater resolution or lower loss, or may be analyzed to recognize features and thus generate additional meta-data which would not otherwise be available.

Figure 15:
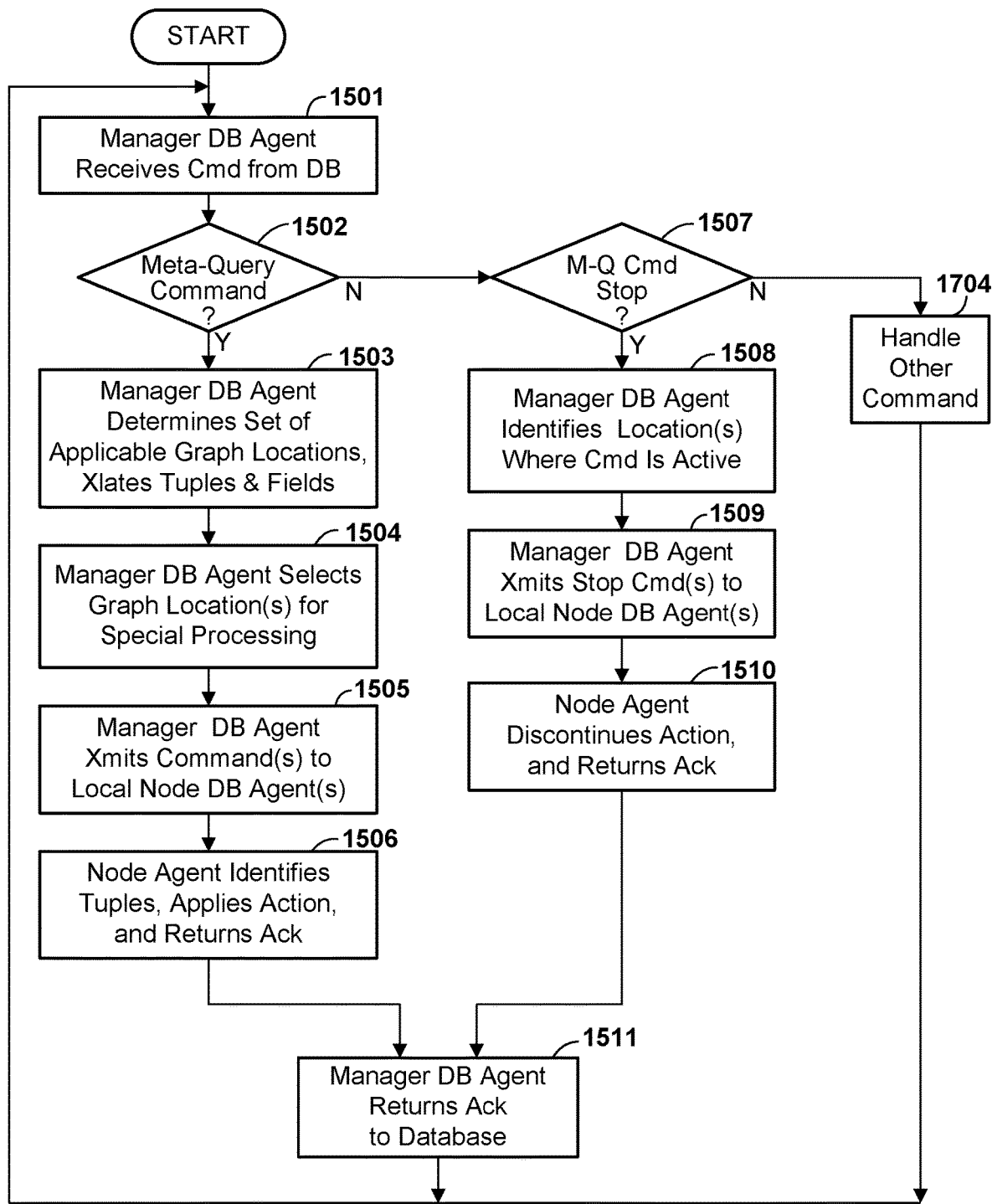
FIG. 15 is a flow diagram illustrating in greater detail a process of modifying the manner in which in-flight data is processed in the stream computing application responsive to a meta-query command from the database, according to various embodiments.

The meta-query command is transmitted to the stream computing application (block 1410) for execution. In one or more embodiments, the command is transmitted to management system database agent 521 within the stream manager, which in turn transmits one or more respective commands to respective compute node database agents 321 in each applicable compute node 110, as illustrated in FIG. 15 and explained further herein.

The query monitor's analysis function further determines whether there are any outstanding unusually high frequency word/phrase meta-query commands which were issued as a result of an unusually high frequency word/phrase detected in a previous cycle, and are still actively being performed by the stream computing application (block 1411). If so (the 'Y' branch from block 1411), the outstanding meta-queries are reviewed to determine whether the respective frequencies of occurrence of any word/phrase has dropped below some low interest threshold, indicating that users of the database no longer have any great interest in the corresponding subject (block 1412). The low interest threshold need not be the same as, and is typically expected to be lower than, the initial threshold for identifying a high frequency word or phrase used in blocks 1405-1406. If any such meta-queries have fallen below the low interest threshold, a meta-query stop command is generated, directing the stream computing application to discontinue special processing of data identified in the corresponding meta-query command (block 1413). The meta-query stop command is transmitted to the stream computing application in a similar manner to the original meta-query command (block 1414).

The composite query parameter histogram data is aged (block 1415). Aging is performed so that newer data predominates in importance over older data. When the composite query parameter histogram data is combined with data collected from queries monitored in the next collection interval, the data from the next collection interval should have a greater importance than data from any previous interval. A simple way to age histogram data is to multiply all frequency totals by a constant between zero and one, although alternative techniques could be used. Data may further be aged by deleting from the histograms any entry having a frequency below some threshold of significance.

The analysis of the most recent monitored query data is then complete. Upon expiration of the interval timer for the next interval, the 'Y' branch is again taken from block 1402 and another monitored query parameter dataset is captured and analyzed as described, the process being repeated indefinitely.

FIG. 15 is a flow diagram illustrating in greater detail a process of modifying the manner in which in-flight data is processed in the stream computing application responsive to a meta-query command from the database, according to various embodiments.

Referring to FIG. 15, the management system database agent 521 in management system 105 functions as the point of contact for the database manager 811, and receives a command from the database manager (block 1501). If the received command is a meta-query command directing the stream application to process selective in-flight data as defined by the meta-query in a special manner, the 'Y' branch is taken from block 1502.

In response to receiving the meta-query command, the management system database agent 521 translates tuples and fields if required, and determines a set of one or more locations within the stream computing application's operator graph containing data to which command might be applied (block 1503). Generally, this means determining the locations through which the applicable tuple type or types traverse the operator graph. The manager database agent may access the applicable profile summary records 526 to determine locations within the operator graph at which the tuple or tuples which are the subject of the meta-query command can be found, and additionally, the type identifier for such tuples within the data streaming application if the type identifier is not the same as that specified by the command e.g., not the same as that used by the database. As explained previously, each profile summary record 1201 corresponds to a respective output tuple type 1202 and respective graph location 1203. For each tuple type specified in the command, the profile summary records 1201 having output tuple type field 1202 corresponding to the tuple type of the command are identified, and a set of corresponding graph locations determined, this set of corresponding graph locations being a subset of all locations in the operator graph.

Since tuples within the stream computing application may be generated from other tuples, and the names of tuples and fields used within the stream computing application are not necessarily the same as used in data output to the database, the manager database agent may translate tuples/fields specified in the meta-query command to tuples/fields used internally in the stream computing application for purposes of identifying internal data of interest. This again may be performed using the profile summary records 526. Each summary record 1201 specifying an output tuple type 1202 and graph location 1203 may also specify an internal tuple type 1204 corresponding to a tuple type used internally within the stream computing application at the corresponding graph location specified in graph location field 1203. If a tuple is specified in the logical query, this is an output tuple from the perspective of the profile summary record 1201, and is translated to the corresponding internal tuple specified in internal tuple type field 1204. Similarly, the profile summary record may contain one or more stable field output 1206 and corresponding stable field internal 1207 pairs. For each stable field specified in the logical query, the stable field output identifier 1206 is matched with the stable field, and is replaced in the logical query with the corresponding stable field internal identifier 1207 from the profile summary record.

In addition to the logical parameters defining the data (tuples) which are to be subject to special processing, the meta-query command explicitly or implicitly specifies the special processing operations to performed. In one or more optional embodiments, the received meta-query command may further contain scope data which restricts the scope of the command to selective portions of the stream computing application, for example, to selective nodes in the operator graph. If the meta-query command itself further limits the scope of data to be modified to some portion of the stream computing application, then any graph locations outside the command's scope would not be included in the set of graph locations.

The management system database agent 521 selects one or more locations among the set of applicable locations for receipt of a local version of the meta-query command (block 1504). Often, only a single location is selected, although multiple locations could be selected. In one or more embodiments in which the special processing comprises increasing the processing priority of tuples matching the meta-query's logical condition, agent 521 traverses the operator graph backwards to find the earliest occurrence of tuples of the desired type in the operator graph at which the field or fields which are the subjects of the logical condition of the meta-query are considered stable, and selects the corresponding location as a location for altering the priority of the matching tuples.

In one or more alternative embodiments, the location at which the meta-query is to be received and applied is determined according to the specified processing action. For example, if the specified action is to perform a particular operation on the data in the tuple, and this operation is performed in Node X, a node which branches to Node X may be selected. In one or more further alternative embodiments, expectation values reflecting a probability that a particular tuple types or sets of tuples will be output to the database may be used to select nodes for applying the specified action; for example, if an expectation value of a particular tuple at a particular node is extremely low, the database management agent may choose to omit such a node from the selection to avoid special processing of data which is unlikely to enter the database. In on or more further alternative embodiments, the location at which the meta-query is to be received and applied is specified in the meta-query itself.

The management system database agent transmits a local version of the meta-query command to the respective local node database agent 321 in the location(s) selected (block 1505). The local version of the meta-query command may be identical to the command received by the database agent 521 from the database manager, or may be a version which is modified, e.g., by translating tuple and/or field names or otherwise.

Responsive to receiving the local version of the meta-query command, the local node agent 321 identifies any tuples passing through it which satisfy the logical condition expressed in the meta-query, and for each such tuple identified, causes the action specified by the meta-query command to be performed with respect to the identified tuple (block 1506).

In general, tuples passing through a node are temporarily stored in the node's local buffer 314. Local node agent 321 may identify tuples satisfying the logical condition of the meta-query by snooping as each tuple enters or leaves the local buffer, or by some other operation. For example, if tuples within a buffer are organized into partitions or similar structures based on a key value, this partitioning may be used to reduce the scope of tuples which must be examined. It would also be possible to use metadata structures (not shown) in the stream computing application.

For example, where the action is an increase in the processing priority of the identified tuple, the local node agent may alter the value of priority field 406 in the tuple, thus causing any further processing performed by the stream computing application to be performed at a higher priority for the corresponding tuple. As an additional example, the local node agent may cause the identified tuple to take a branch to a different node in the operator graph than it would otherwise branch to, the different node performing at least one processing step with respect to the identified tuple; this might be accomplished, for example, by setting an appropriate control flag in the tuple to cause it to take the branch. The local node also returns an acknowledgment message to the management system database agent. In one or more embodiments, the local node agent continues to identify tuples as they are processed by its node and applies the specified operation to those identified tuples, until it is commanded to stop.

The management system database agent returns an acknowledgment to the database that the requested action has been received and is being performed in the stream computing application (block 1511).

If, at block 1502, the received command was other than a meta-query command (the 'N' branch from block 1502), then if the received command was a meta-query stop command directing the stream computing application to discontinue special processing of certain data (the 'Y' branch from block 1507), the management system database agent 521 identifies the graph locations at which the correspond stop command is active (block 1508). Generally, these would be the locations to which the management system database agent previously sent a local version of the meta-query command. The management system database agent then transmits a meta-query stop command to each the respective local node database agent 321 in each such location (block 1509). The local node agent discontinues the corresponding action and returns an acknowledgment to the management system database agent (block 1510). The management system database agent returns an acknowledgment to the database that the requested stop has been received and performed (block 1511).

If, at blocks 1502 and 1507, the command received from the database is nether a meta-query command nor a meta-query stop command, the 'N' branch is taken from block 1507, and the command is handled in an appropriate manner (block 1512). Such other command could include, for example, a query of in-flight data or command to modify in-flight data, as disclosed in any of commonly assigned U.S. patent application Ser. No. 15/339,772, filed Oct. 31, 2016, commonly assigned U.S. patent application Ser. No. 15/339,800, filed Oct. 31, 2016, or commonly assigned U.S. patent application Ser. No. 15/339,819, filed Oct. 21, 2016, all of which are herein incorporated by reference.

In the embodiments described above, the database agent in the management system manages the profile data and performs any modifications of the query. However, some or all of these actions might alternatively be performed by the database itself, or by some other component within the data streaming application. For example, operator graph profile data or alternative data might be provided to the database, which performs any required translation of the logical query before the same is transmitted to the data streaming application, and performs any required translation of results after the same are received. As a further example, certain profile data might be provided to the local compute nodes, which perform translations and/or assign expectation values.

Other Variations

Although a series of steps has been described above as one or more preferred and/or alternate embodiments, it will be appreciated that many variations of processes for characterizing a data streaming application, accessing in-flight data within a data streaming application, and analyzing accessed data to project data entering a database are possible. In particular, some steps may be performed in a different order, different data structures may be used, and/or different hardware or software resources may be employed to perform functions described herein. Furthermore, although certain formulae, thresholds, logical conditions, and so forth may have been disclosed as one or more embodiments, it will be appreciated that these formulae, thresholds, logical conditions, etc., and variations thereof are only some of the possible embodiments, and that other techniques could alternatively be used.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. Examples of a computer readable storage medium are illustrated in FIG. 2 as system memory 202 and data storage devices 221-223. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Unless inconsistent with the invention or otherwise qualified herein, computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although a specific embodiment of the invention has been disclosed along with certain alternatives, it will be recognized by those skilled in the art that additional variations in form and detail may be made within the scope of the following claims:

What is claimed is:

1. A computer-executed method, comprising:
   monitoring queries against data in a computerized database to generate at least one parameter defining data of interest;
   identifying selective in-flight data in a stream computing application which matches the at least one parameter defining the data of interest, the stream computing application producing output data for inclusion in the computerized database; and
   responsive to said identifying selective in-flight data in the stream computing application which matches the at least one parameter defining the data of interest, modifying the manner in which the selective in-flight data is processed by the stream computing application.

2. The computer-executed method of claim 1, wherein said modifying the manner in which the selective in-flight data is processed by the stream computing application comprises performing at least one additional processing action by the stream computing application on the selective in-flight data to produce at least one of enhanced data or enhanced metadata for output to the computerized database.

3. The computer-executed method of claim 2, wherein performing at least one additional processing action to produce at least one of enhanced data or enhanced metadata comprises at least one of: (a) using at least one algorithm to provide greater accuracy of produced data or metadata; (b) using at least one algorithm to provide greater resolution of produced data or metadata; (c) using at least one algorithm to identify a pattern or feature of produced data or metadata; and (d) using at least one algorithm to identify and/or correct probable errors in the produced data or metadata.

4. The computer-executed method of claim 1, wherein the at least one parameter defining data of interest comprises at least one logical query specifying the data of interest.

5. The computer-executed method of claim 1, further comprising:
transmitting a meta-query command from the computerized database to the stream computing application, the meta-query command including a logical expression to be applied to at least one type of data tuple, the logical expression defining the data of interest, the meta-query command further specifying at least one action to be performed with respect each of a plurality of data tuples satisfying the conditions of the logical expression.

6. The computer-executed method of claim 1, wherein said identifying selective in-flight data in the stream computing application which matches the at least one parameter defining the data of interest comprises:
receiving, in a management system of the stream computing application, a command containing the at least one parameter defining the data of interest;
sending, from the management system to a respective agent in each of at least one compute node of the stream computing application, a command containing the at least one parameter defining the data of interest;
identifying, in each of the at least one compute node, respective data matching the at least one parameter defining the data of interest.

7. The computer-executed method of claim 1, further comprising:
collecting trace data from at least one execution instance of the stream computing application;
analyzing the collected trace data to produce profile data characterizing the stream computing application; and
using the profiling data to identify one or more locations in an operator graph of the stream computing application at which the selective in-flight data is identified.

8. The computer-executed method of claim 7, wherein said profile data characterizing the stream computing application comprises a plurality of profile summary records, each profile summary record corresponding to a respective tuple and respective location of the respective tuple within the data streaming application.

9. The computer-executed method of claim 8, wherein at least some of said profile summary records comprise a respective at least one stable field identifier identifying a respective field which does not change value from the respective location within the data streaming application and an output tuple.

10. A non-transitory computer-readable media having recorded thereon a computer program having a plurality of computer-executable instructions, wherein the computer program, when executed by at least one computer system, causes the at least one computer system to perform actions comprising:
monitoring queries against data in a computerized database to generate at least one parameter defining data of interest;
identifying selective in-flight data in a stream computing application which matches the at least one parameter defining the data of interest, the stream computing application producing output data for inclusion in the computerized database; and
responsive to said identifying selective in-flight data in the stream computing application which matches the at least one parameter defining the data of interest, modifying the manner in which the selective in-flight data is processed by the stream computing application.

11. The non-transitory computer-readable media of claim 10, wherein modifying the manner in which the selective in-flight data is processed by the stream computing application comprises performing at least on additional processing action by the stream computing application on the selective in-flight data to produce at least one of enhanced data or enhanced metadata for output to the computerized database.

12. The non-transitory computer-readable media of claim 11, wherein performing at least one additional processing action to produce at least one of enhanced data or enhanced metadata comprises at least one of: (a) using at least one algorithm to provide greater accuracy of produced data or metadata; (b) using at least one algorithm to provide greater resolution of produced data or metadata; (c) using at least one algorithm to identify a pattern or feature of produced data or metadata; and (d) using at least one algorithm to identify and/or correct probable errors in the produced data or metadata.

13. The non-transitory computer-readable media of claim 10, wherein the at least one parameter defining data of interest comprises at least one logical query specifying the data of interest.

14. The non-transitory computer-readable media of claim 10, further comprising:
transmitting a meta-query command from the computerized database to the stream computing application, the meta-query command including a logical expression to be applied to at least one type of data tuple, the logical expression defining the data of interest, the meta-query command further specifying at least one action to be performed with respect each of a plurality of data tuples satisfying the conditions of the logical expression.

15. The non-transitory computer-readable media of claim 10, wherein said identifying selective in-flight data in the stream computing application which matches the at least one parameter defining the data of interest comprises:
receiving, in a management system of the stream computing application, a command containing the at least one parameter defining the data of interest;
sending, from the management system to a respective agent in each of at least one compute node of the stream computing application, a command containing the at least one parameter defining the data of interest;
identifying, in each of the at least one compute node, respective data matching the at least one parameter defining the data of interest.

16. The non-transitory computer-readable media of claim 10, wherein the computer program further causes the computer system to perform actions comprising:
collecting trace data from at least one execution instance of the stream computing application;
analyzing the collected trace data to produce profile data characterizing the stream computing application; and
using the profiling data to identify one or more locations in an operator graph of the stream computing application at which the selective in-flight data is identified.

17. The non-transitory computer-readable media of claim 16, wherein said profile data characterizing the stream computing application comprises a plurality of profile summary records, each profile summary record corresponding to a respective tuple and respective location of the respective tuple within the data streaming application.

18. The non-transitory computer-readable media of claim 17, wherein at least some of said profile summary records comprise a respective at least one stable field identifier identifying a respective field which does not change value from the respective location within the data streaming application and an output tuple.

19. A data processing apparatus supporting a database, the database receiving input from a stream computing application, the data processing apparatus comprising:
- at least one physical processor;
- at least one physical memory;
- at least one database table containing a plurality of tuples storable in the memory;
- a database manager embodied as instructions executable on the at least one processor and storable in the at least one memory, the database manager including a query function for executing logical queries against data in the at least one database table, and a query monitor which monitors the logical queries to generate at least one parameter defining data of interest;
- wherein the data base manager, responsive to the query monitor generating at least one parameter defining data of interest, transmits a command to the stream computing application to identify selective in-flight data in the stream computing application which matches the at least one parameter defining the data of interest and to modify the manner in which the selective in-flight data is processed by the stream computing application; and
- wherein the stream computing application, responsive to receiving the command to to identify selective in-flight data in the stream computing application which matches the at least one parameter defining the data of interest and to modify the manner in which the selective in-flight data is processed by the stream computing application, identifies selective in-flight data in the stream computing application which matches the at least one parameter defining the data of interest, and modifies the manner in which the selective in-flight data is processed by the stream computing application.

20. The data processing apparatus of claim 19, wherein modifying the manner in which the selective in-flight data is processed by the stream computing application comprises performing at least on additional processing action by the stream computing application on the selective in-flight data to produce at least one of enhanced data or enhanced metadata for output to the computerized database.

* * * * *